United States Patent
Lin et al.

(10) Patent No.: US 8,023,370 B2
(45) Date of Patent: *Sep. 20, 2011

(54) APPARATUS AND METHOD FOR CONVERTING GROOVE/LAND POLARITY UPON GROOVE/LAND TRACK CHANGE ON OPTICAL MEDIUM

(75) Inventors: Meng-Hsueh Lin, Banciao (TW); Chang-long Wu, Hsinchu (TW)

(73) Assignee: MEDIATEK Inc., Hsin-Chu (TW)

( * ) Notice: Subject to any disclaimer, the term of this patent is extended or adjusted under 35 U.S.C. 154(b) by 156 days.

This patent is subject to a terminal disclaimer.

(21) Appl. No.: 12/511,393

(22) Filed: Jul. 29, 2009

(65) Prior Publication Data

US 2009/0323507 A1    Dec. 31, 2009

Related U.S. Application Data

(63) Continuation-in-part of application No. 11/398,512, filed on Apr. 5, 2006, now Pat. No. 7,613,087.

(60) Provisional application No. 60/730,183, filed on Oct. 25, 2005.

(51) Int. Cl.
G11B 27/36    (2006.01)
(52) U.S. Cl. ............... 369/47.23; 369/44.26; 369/53.2; 369/30.13; 369/53.37
(58) Field of Classification Search ............ 369/47.23, 369/44.26, 44.29, 47.27, 53.2, 275.3, 30.1, 369/30.13, 44.28, 53.37
See application file for complete search history.

(56) References Cited

U.S. PATENT DOCUMENTS

| | | |
|---|---|---|
| 5,523,990 A | 6/1996 | Chiba |
| 5,623,468 A | 4/1997 | Takeda et al. |
| 5,822,263 A | 10/1998 | Campbell et al. |
| 5,867,474 A | 2/1999 | Nagasawa et al. |
| 6,055,218 A | 4/2000 | Takeda et al. |
| 6,055,219 A | 4/2000 | Ho et al. |
| 6,088,307 A | 7/2000 | Fushimi et al. |
| 6,091,678 A | 7/2000 | Fushimi et al. |
| 6,091,699 A | 7/2000 | Nakane et al. |
| 6,195,320 B1 | 2/2001 | Furumiya et al. |
| 6,233,207 B1 | 5/2001 | Tanaka |
| 6,333,902 B1 | 12/2001 | Shim |
| 6,747,932 B1 | 6/2004 | Jeon |
| 7,433,283 B2 | 10/2008 | Wu et al. |
| 2003/0058757 A1 | 3/2003 | Miyagawa et al. |
| 2005/0002298 A1 | 1/2005 | Hou |
| 2005/0120261 A1 | 6/2005 | Lin et al. |
| 2005/0157603 A1 | 7/2005 | Tseng et al. |

FOREIGN PATENT DOCUMENTS

| | | |
|---|---|---|
| EP | 1329883 | 7/2003 |
| TW | 200502921 | 1/2005 |

*Primary Examiner* — Jorge Ortiz Criado

(57) ABSTRACT

An apparatus for converting a groove/land polarity on an optical medium, comprises a physical identification (PID) detector for detecting a first PID value from a first sector, a sector information unit for providing an information which includes a second PID value indicative of either a second sector or at least one reference groove/land changing point, a sector counter for counting a first value whose an initiation is set by the sector information unit based on the information and/or by the PID detector based on the first PID value, and a comparing unit for determining at least one oncoming groove/land changing points, when the first value approaches a second value predetermined in or generated by the sector information unit according to the information.

20 Claims, 16 Drawing Sheets

| | | | Normal radius (min) | Number of Sectors per track | Number of tracks | Sector number (hex value) |
|---|---|---|---|---|---|---|
| Lead-In area | Embossed data zone | Initial zone Reference code zone Buffer zone1 Control data zone Buffer zone2 | 22.59 max~23.996 | 18 | 1896 min | ~ 02 EFFF 02 F000 ~ 02 F00F 02 F010 ~ 02 F1FF 02 F200 ~ 02 FDFF 02 FE00 ~ 02 FFFF |
| | Mirror zone | Connection zone | 23.996 ~ 24.000 | | | |
| | Rewritable data zone | Guard track zone Disc test zone Drive test zone Guard track zone Disc identification zone DMA1 & DMA2 | 24.000 ~ 24.101 | 25 | 1568 | 03 0000 ~ 03 01FF 03 0200 ~ 03 05FF 03 0600 ~ 03 0CFF 03 0D00 ~ 03 0EFF 03 0F00 ~ 03 0F7F 03 0F80 ~ 03 0FFF |
| Data area (Rewritable data zone) | | Zone0 | 24.101~24.964 | 25 | | 03 1000 ~ 03 991F |
| | | Zone1 | 24.964~25.929 | 26 | 1568 | 03 9920 ~ 04 385F |
| | | Zone2 | 25.929~26.893 | 27 | 1568 | 04 3860 ~ 04 DDBF |
| | | Zone3 | 26.893~27.857 | 28 | 1568 | 04 DDC0 ~ 05 893F |
| | | Zone4 | 27.857~28.822 | 29 | 1568 | 05 8940 ~ 06 3ADF |
| | | Zone5 | 28.822~29.786 | 30 | 1568 | 06 3AE0 ~ 06 F29F |
| | | Zone6 | 29.786~30.750 | 31 | 1568 | 06 F2A0 ~ 07 B07F |
| | | Zone7 | 30.750~31.715 | 32 | 1568 | 07 B080 ~ 08 747F |
| | | Zone8 | 31.715~32.697 | 33 | 1568 | 08 7480 ~ 09 3E9F |
| | | Zone9 | 32.697~33.643 | 34 | 1568 | 09 3EA0 ~ 0A 0EDF |
| | | Zone10 | 33.643~34.608 | 35 | 1568 | 0A 0EE0 ~ 0A E53F |
| | | Zone11 | 34.608~35.572 | 36 | 1568 | 0A E540 ~ 0B C1BF |
| | | Zone12 | 35.572~36.536 | 37 | 1568 | 0B C1C0 ~ 0C A45F |
| | | Zone13 | 36.536~37.500 | 38 | 1568 | 0C A460 ~ 0D 8D1F |
| | | Zone14 | 37.500~38.465 | 39 | 1568 | 0D 8D20 ~ 0E 7BFF |
| | | Zone15 | 38.465~39.429 | 40 | 1568 | 0E 7C00 ~ 0F 70FF |
| | | Zone16 | 39.429~40.393 | 41 | 1568 | 0F 7100 ~ 10 6C1F |
| | | Zone17 | 40.393~41.358 | 42 | 1568 | 10 6C20 ~ 11 6D5F |
| | | Zone18 | 41.358~42.322 | 43 | 1568 | 11 6D60 ~ 12 74BF |
| | | Zone19 | 42.322~43.286 | 44 | 1568 | 12 74C0 ~ 13 823F |
| | | Zone20 | 43.286~44.251 | 45 | 1568 | 13 8240 ~ 14 95DF |
| | | Zone21 | 44.251~45.215 | 46 | 1568 | 14 95E0 ~ 15 AF9F |
| | | Zone22 | 45.215~46.179 | 47 | 1568 | 15 AFA0 ~ 16 CF7F |
| | | Zone23 | 46.179~47.144 | 48 | 1568 | 16 CF80 ~ 17 F57F |
| | | Zone24 | 47.144~48.108 | 49 | 1568 | 17 F580 ~ 19 219F |
| | | Zone25 | 48.108~49.072 | 50 | 1568 | 19 21A0 ~ 1A 53DF |
| | | Zone26 | 49.072~50.037 | 51 | 1568 | 1A 53E0 ~ 1B 8C3F |
| | | Zone27 | 50.037~51.001 | 52 | 1568 | 1B 8C40 ~ 1C CABF |
| | | Zone28 | 51.001~51.965 | 53 | 1568 | 1C CAC0 ~ 1E 0F5F |
| | | Zone29 | 51.965~52.930 | 54 | 1568 | 1E 0F60 ~ 1F 5A1F |
| | | Zone30 | 52.930~53.894 | 55 | 1568 | 1F 5A20 ~ 20 AAFF |
| | | Zone31 | 53.894~54.858 | 56 | 1568 | 20 AB00 ~ 22 01FF |
| | | Zone32 | 54.858~55.823 | 57 | 1568 | 22 0200 ~ 23 5F1F |
| | | Zone33 | 55.823~56.787 | 58 | 1568 | 23 5F20 ~ 04 C25F |
| | | Zone34 | 56.787~57.889 | 59 | 1792 | 24 C260 ~ 26 5F5F |
| Lead-out area (Rewritable data zone) | | DMA3 & DMA4 Disc identification zone Guard track zone Drive test zone Disc test zone Guard Track zone | 57.889~58.493 | 59 | 982.5 | 26 5F60 ~ 26 601F 26 6020 ~ 26 60DF 26 60E0 ~ 26 62DF 26 62E0 ~ 26 69DF 26 69E0 ~ 26 70DF 26 70E0 ~ 27 41CF |

Fig. 5

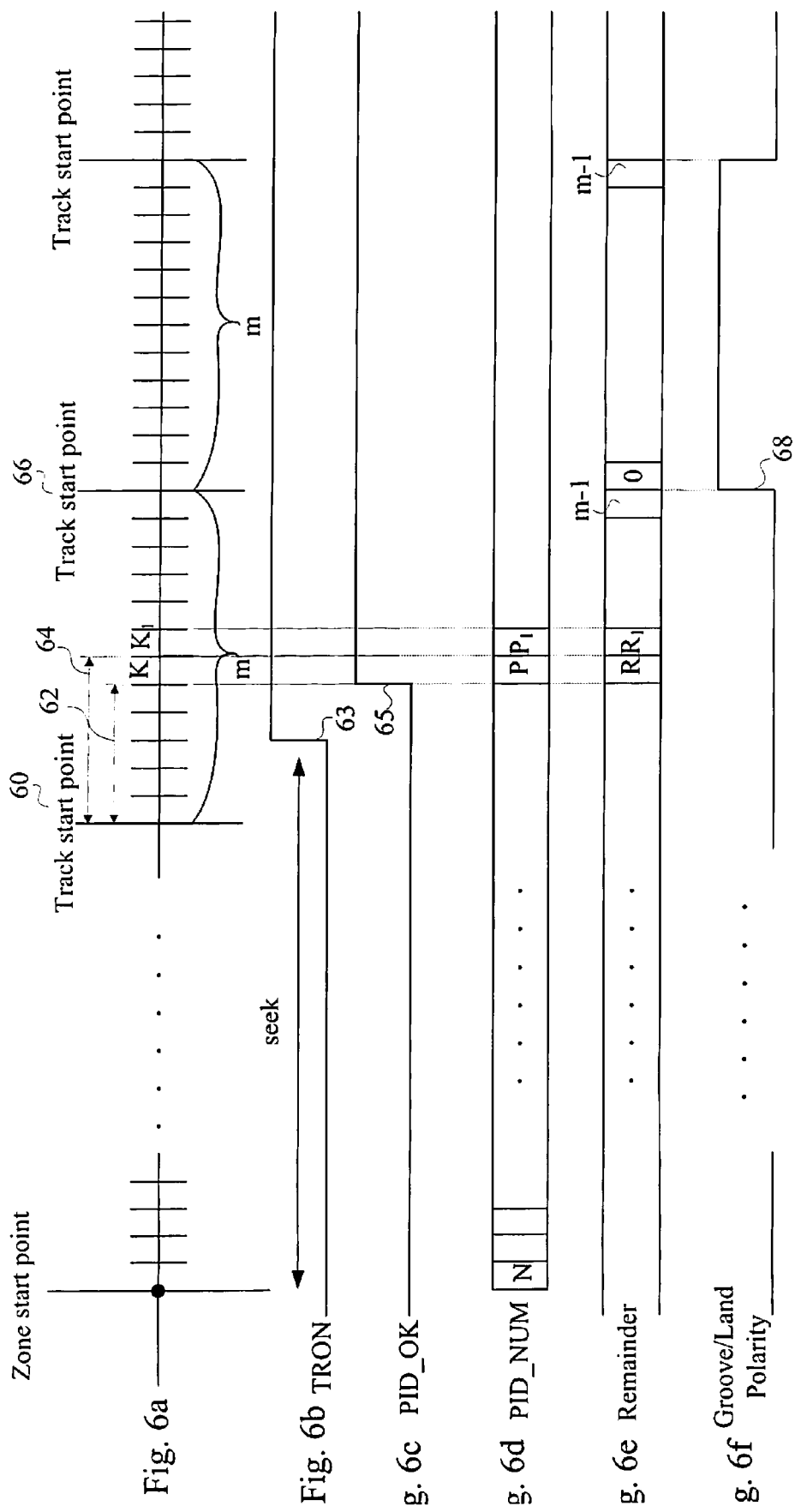

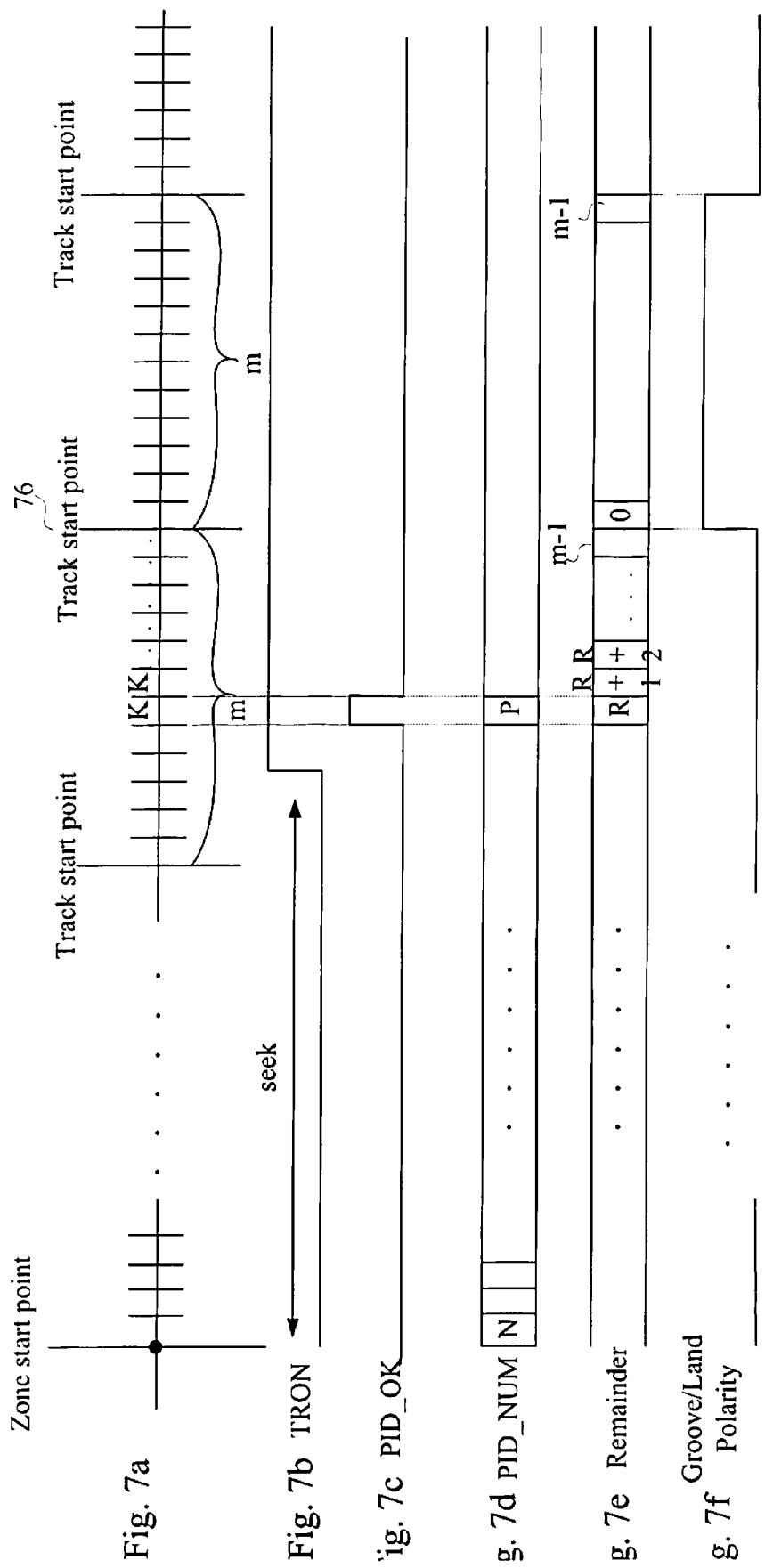

APPARATUS AND METHOD FOR CONVERTING GROOVE/LAND POLARITY UPON GROOVE/LAND TRACK CHANGE ON OPTICAL MEDIUM

CROSS-REFERENCE TO RELATED APPLICATION

The present application is a continuation-in-part of application Ser. No. 11/398,512, filed Apr. 5, 2006, now U.S. Pat. No. 7,613,087 which claims the benefit of a provisional Application No. 60/730,183, filed Oct. 25, 2005, which is incorporated by reference herein in its entirety.

BACKGROUND OF INVENTION

1. Field of the Invention

The present invention relates to an apparatus and method for converting groove/land polarity, and especially in an apparatus and method capable of toggling a reliable and exact groove/land polarity upon determination of a groove/land track change on an optical medium.

2. Description of the Related Art

Recently, various types of disk-shaped optical medium with high-density capacity was progressively developed in compliance with trends of accommodating huge amounts of digital contents, for instance, video or audio data. For one kind of disk-shaped optical medium such as DVD±RW, the data is recorded by a pickup head of a recording/reading device in grooves as pits formed on the surface of the optical medium. For another kind of disk-shaped optical medium such as DVD-RAM (Digital Versatile Disk-Random Access Memory), the data is successively allocated and recorded by a pickup head in both grooves and lands as different-layer pits formed on the surface of the optical medium. Such a groove/land track on the optical medium is divided into specific number of sectors each containing an embossed header data region and a user data region. The embossed header data region prerecords a physical identification data (PID) with reference to physical layout of the sector where the embossed header data region is located. Each sector owns its physical identification data (PID) independent of the other sectors. As soon as an alternation of land and groove tracks, i.e. a track changing position from a groove to a land or vice versa, is scanned by a beam spot of the pickup head during a reading/writing process on the optical medium, a track converting signal responsive to the track change is generated to enable a servo unit of the reading/writing device to toggle a groove/land polarity (phase) of an output control thereby reliably reading/writing data from or onto the optical medium.

Thus, it is a great topic of interest in how to determine a groove/land changing position on the optical medium to ensure a stable servo control during each recording/reading process on the optical medium.

A prior art disclosed in an U.S. Pat. No. 6,091,678 specifies that a tracking error signal (also called a "high frequency push-pull" or "HPP" signal) is generated to decide a polarity of the header field (plus or minus) responsive to a groove/land track change on an optical medium. Then a groove/land polarity toggle point 12 (as shown in FIG. 1b) will be determined upon occurrence of a phase difference resulted from the polarity change of an envelope signal. For example shown in FIG. 1a, a cycle 10 of an envelope signal has a 180-degree phase difference relative to the previous cycle 6. However, the envelope signal is often unstable to be detected during slice and therefore is insufficient to determine the groove/land polarity toggle point.

Another prior art disclosed in an U.S. Pat. No. 6,333,902 specifies that a groove/land changing position can be determined by counting down a total number of sectors to find the last sector at an end of a track wherein the number of sectors can be counted by counting cycles of the wobble signal since the wobble exists in each sector. Alternatively, the U.S. Pat. No. 6,333,902 further specifies that a groove/land changing position can be determined by finding out a bit value of physical identification data relative to any one of the last 3 sequent sectors at an end of a track. However, as long as the physical identification data of the last 3 sectors in each track all fails to be decoded, the mechanism also fails to determine an exact groove/land changing position.

To address the foregoing drawbacks, it is, therefore, a primary objective of the present invention to provide an apparatus and method for converting a groove/land polarity upon determination of a groove/land track change on an optical medium, which merely needs to initially find out a reference groove/land changing point on the optical medium, or pick up any one decoded physical identification data (PID) on the optical medium, and then is cable of timely and determining the next groove/land changing points for converting groove/land polarity, even all of the next track changing points distributed on the optical medium, especially for one kind of optical medium which has to use an exact groove/land information to perform a stable servo control. Also, the present invention needs not to decode the last sectors for finding out each one of the groove/land changing points on the optical medium.

It is a secondary objective of the present invention to provide an apparatus and method for converting a groove/land polarity upon determination of a groove/land track change on an optical medium, which merely needs to initially find out a relationship between a first PID value of a first sector decoded and a second PID value of either a second sector provided or a reference groove/land changing point formed on the optical medium, and then is cable of timely and determining each of oncoming groove/land changing points on the optical medium for converting the groove/land polarity.

To achieve the aforementioned objectives, a first embodiment of the present invention introduces an apparatus for determining a groove/land polarity upon a groove/land track change on an optical medium, which includes a reference groove/land detector, a sector information unit, a sector counter, a comparator and a groove/land toggling unit. Meanwhile, the reference groove/land detector is operative to initially detect a reference groove/land changing point in a zone of the optical medium. The sector information unit as a lookup table pre-stores some sector information relative to the optical medium, thereby providing a first value indicating a total number of sectors per track based on the detected zone on the optical medium. The sector counter is operative to count a number of sectors per a predetermined cycle, from the reference groove/land changing point to approach a subsequent groove/land changing point along a track where the reference groove/land changing point belongs, and the number of sectors counted per the predetermined cycle is treated to be a second value. The comparator compares the first value with the second value to determine whether the subsequent groove/land changing point occurs on the optical medium or not. While the first value is found identical with the second value, the groove/land polarity conversion is performed at a header.

Furthermore, a method for converting a groove/land polarity upon a groove/land track change on an optical medium is introduced as the following steps of:

detecting a reference groove/land changing point formed in a zone of the optical medium;

generating a first value indicating a total number of sectors per track according to the detected zone;

generating a second value by counting a number of sectors per a predetermined cycle, from the reference groove/land changing point to approach a subsequent groove/land changing point along a track where the reference groove/land changing point belongs;

comparing the first value with the second value per the predetermined cycle;

determining the subsequent groove/land changing point to toggle a groove/land polarity when the first value is found identical with the second value; and After the subsequent groove/land changing point is determined, setting the second value to zero for re-generating the second value per the predetermined cycle by counting the number of sectors until the other oncoming groove/land changing points are determined one by one.

Moreover, another embodiment of the present invention introduces an apparatus for converting a groove/land polarity, which comprises a physical identification (PID) detector detecting a first sector from the optical medium into a first PID value, a sector information unit providing an information of at least one sector, including a second PID value indicative of either a second sector or a reference groove/land changing point laid on the optical medium, a sector counter counting a first value, an initiation of which is set by the sector information unit based on the at least one sector information and/or the PID detector based on the first PID value, and a comparing unit determining at least one of the oncoming groove/land changing points for performing the groove/land polarity conversion, based on when the first value approaches a second value either predetermined or generated by the sector information unit according to the at least one sector information.

Beside, a method for converting a groove/land polarity upon a groove/land track change on an optical medium is introduced as the following steps of:

detecting a first physical identification (PID) value indicating a physical layout of a first sector laid on the optical medium;

providing an information of at least one sector relative to the optical medium, including a second PID value indicative of either a second sector or a reference groove/land changing point laid on the optical medium;

counting a first value, wherein an initiation of the first value is generated based on the at least one sector information and/or the first PID value; and determining at least one of the other groove/land changing points allocated on the optical medium for performing the groove/land polarity conversion, based on when the first value approaches a second value either predetermined or generated according to the at least one sector information.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 5 is a lookup table that predefines a physical relationship among a sector, track and zone on the optical medium;

FIG. 6a is a schematic diagram showing a physical layout of sectors per track in a zone of the optical medium according to the second embodiment of the present invention;

FIG. 6b is a schematic diagram showing a tracking signal output upon a servo control on the optical medium according to the second embodiment of the present invention;

FIG. 6c is a schematic diagram showing a raising edge of a signal output of successfully decoding a specific physical identification value according to the second embodiment of the present invention;

FIG. 6d is a schematic diagram showing each physical identification value relative to the corresponding sequent sector on the optical medium according to the second embodiment of the present invention;

FIG. 6e is a schematic diagram showing each remainder value relative to the corresponding sequent sector according to the second embodiment of the present invention;

FIG. 6f is a schematic diagram showing a groove/land polarity conversion for a groove/land track change determined on the optical medium according to the second embodiment of the present invention;

FIG. 7a is a schematic diagram showing a physical layout of sectors per track in a zone of the optical medium according to the second embodiment of the present invention;

FIG. 7b is a schematic diagram showing a tracking signal output upon a servo control on the optical medium according to the present invention;

FIG. 7c is a schematic diagram showing only one specific sector, which is successfully decoded into a specific physical identification value according to the second embodiment of the present invention;

FIG. 7d is a schematic diagram showing only the physical identification value relative to the decoded sector according to the second embodiment of the present invention;

FIG. 7e is a schematic diagram showing each remainder value relative to the corresponding sequent sector, which is counted up by adding one sector to the previous remainder value, according to the second embodiment of the present invention;

FIG. 7f is a schematic diagram showing a groove/land polarity conversion for a groove/land track change determined on an optical medium according to the present invention;

DETAILED DESCRIPTION

Figure 1:
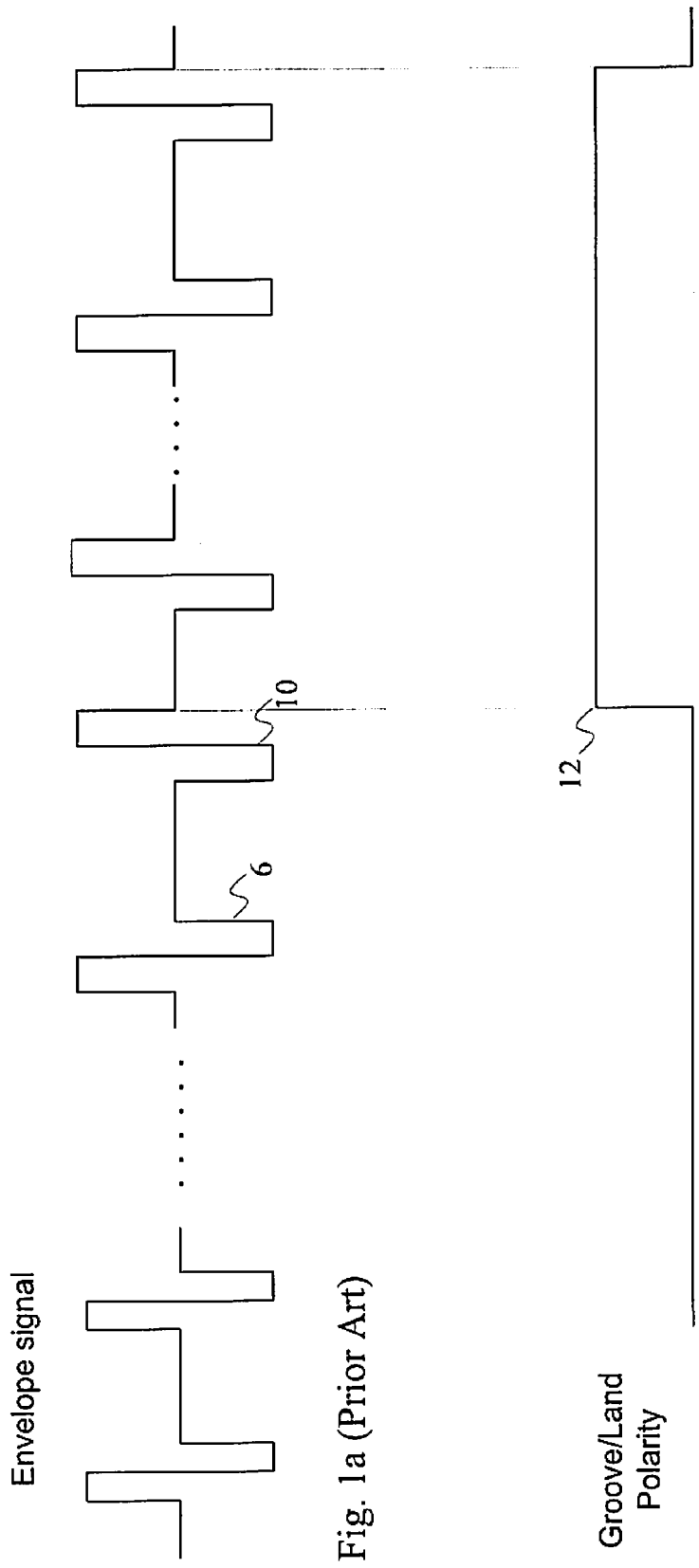
FIG. 1a is a schematic diagram showing a polarity variance of an envelope signal in accordance with a conventional track-polarity converting apparatus.
FIG. 1b is a schematic diagram showing a polarity variance of an output control for a groove/land track change on an optical medium.
Figure 2:
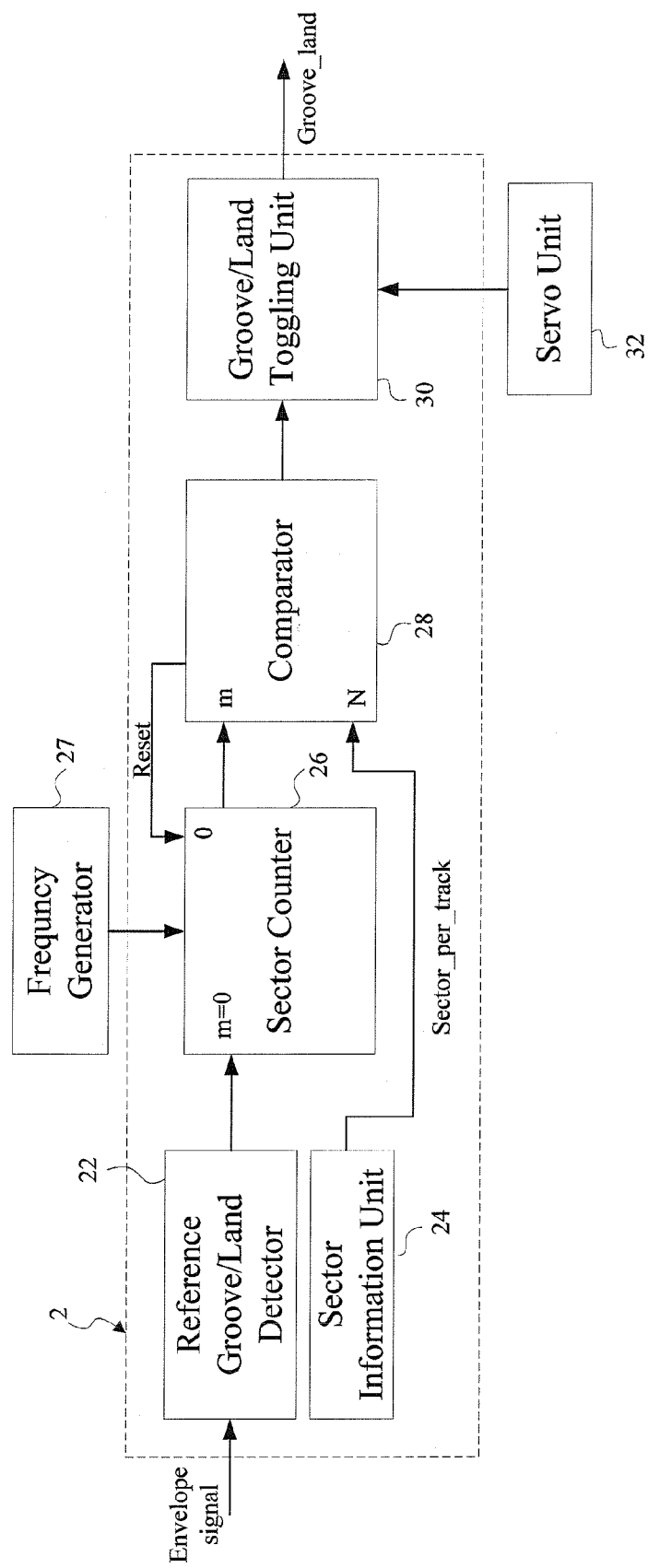
FIG. 2 is a block diagram of a track-polarity converting apparatus according to a first preferred embodiment of the present invention.

Referring to FIG. 2, a track-polarity converting apparatus 2 according to a first embodiment of the present invention for converting a groove/land polarity responsive to a groove/land track change on an optical medium (not shown), comprises a reference groove/land detector 22, a sector information unit 24, a sector counter 26, a comparator 28 and a groove/land toggling unit 30. The reference groove/land detector 22 is operative to seek initially a reference groove/land changing point formed on the optical medium, depending upon a polarity change of an envelope signal as illustrated in FIG. 1a. In another case, a groove/land changing point also can be found by way of counting cycles of the wobble signal to acknowledge the number of sectors per track. As long as the reference groove/land changing point is found, the reference groove/land detector 22 will set a number value "m" of sector as zero for beginning of the sector number counting (i.e. m=m+1, detailed later) of the sector counter 26.

The sector information unit 24 provides the comparator 28 with a first value "N" indicative of a total numbers of sectors per track, according to a zone where said reference groove/land changing point is located. The sector information unit 24 includes, for instance, a built-in lookup table, which pre-stores sequent physical identification data (PID) numbers indicative to physical layout of each sector formed on the optical medium. In another case for DVD-RAM, the total number value "N" of sectors per track according to each different zone on the optical medium may be calculated with the sector information unit 24 using the following Equations (a) and (b).

$$\text{zone\_number} = \left\lfloor \frac{-686 + \sqrt{PID + 313,188}}{28} \right\rfloor \quad \text{Equation (a)}$$

Firstly, the sequent number (i.e. zone_number) of the zone where said reference groove/land changing point is located can be calculated by the Equation (a) with usage of the PID value of said reference groove/land changing point. The operation of Equation (a) ranges from the zone 1 to zone 33 for a general rewritable optical disk, except the zone 0 and zone 34 that are not regular.

Then the total number "N" of sectors per track can be achieved by the Equation (b), according to the zone number.

Total number of sectors per track=zone_number+25  Equation (b)

Said total number "N" of sectors per track is set to a first value for being supplied to the comparator 28.

After the reference groove/land changing point is found, the sector counter 26 counts up a number of sectors by adding one (i.e. m=m+1, "m" is the number of counted sectors and initially set to zero), laid from the reference groove/land changing point to approach a subsequent groove/land changing point, along the track where the reference groove/land changing point is located. The number of sectors per count from the reference groove/land changing point to approach the subsequent groove/land changing point is set to be a second value (as "m" output to the comparator 28. Each sector count employs a predetermined cycle derived from a frequency generator 27, such as a phase-locked loop (PLL) circuit that can lock a wobble signal frequency or an EFM (eight-to-fourteen modulation) signal frequency. In the other word, the number of sectors per count is re-generated by adding one sector to the previous second value.

The comparator 28 compares the first value (the total number of sectors per track, i.e. "N" with the second value (the number of sectors per count, i.e. "m" to check whether the first value is identical with the second value or not. If so, it represents that a sector which being counted is as an aftermost sector located at the end of the track, and neighbors on the subsequent groove/land track changing point formed on the optical medium. Based on the comparison result, the comparator 28 further outputs an enabling signal to the groove/land toggling unit 30 for determination of the subsequent groove/land changing point. Then the groove/land toggling unit 30 toggles the groove/land polarity in response to the subsequent groove/land changing point. When the first value is identical with the second value, the comparator 28 also set the second value "m" of the sector counter 26 to zero, and then the second value will be re-generated by re-counting a number of sectors from the subsequent groove/land changing point until the other oncoming groove/land changing points on the optical medium are found one by one. On the contrary, when the first value is not identical with the second value, the sector counter 26 would continue to count the number of sectors per cycle to output the second value until the first value is identical with the second value for determining the subsequent groove/land changing point.

The groove/land toggling unit 30 as an inversion circuit is operative to toggle a groove/land polarity on a header area of a foremost sector arranged in the subsequent groove/land change of the optical medium, via a servo unit 32 based on the enabling signal output from the comparator 28.

Figure 3:
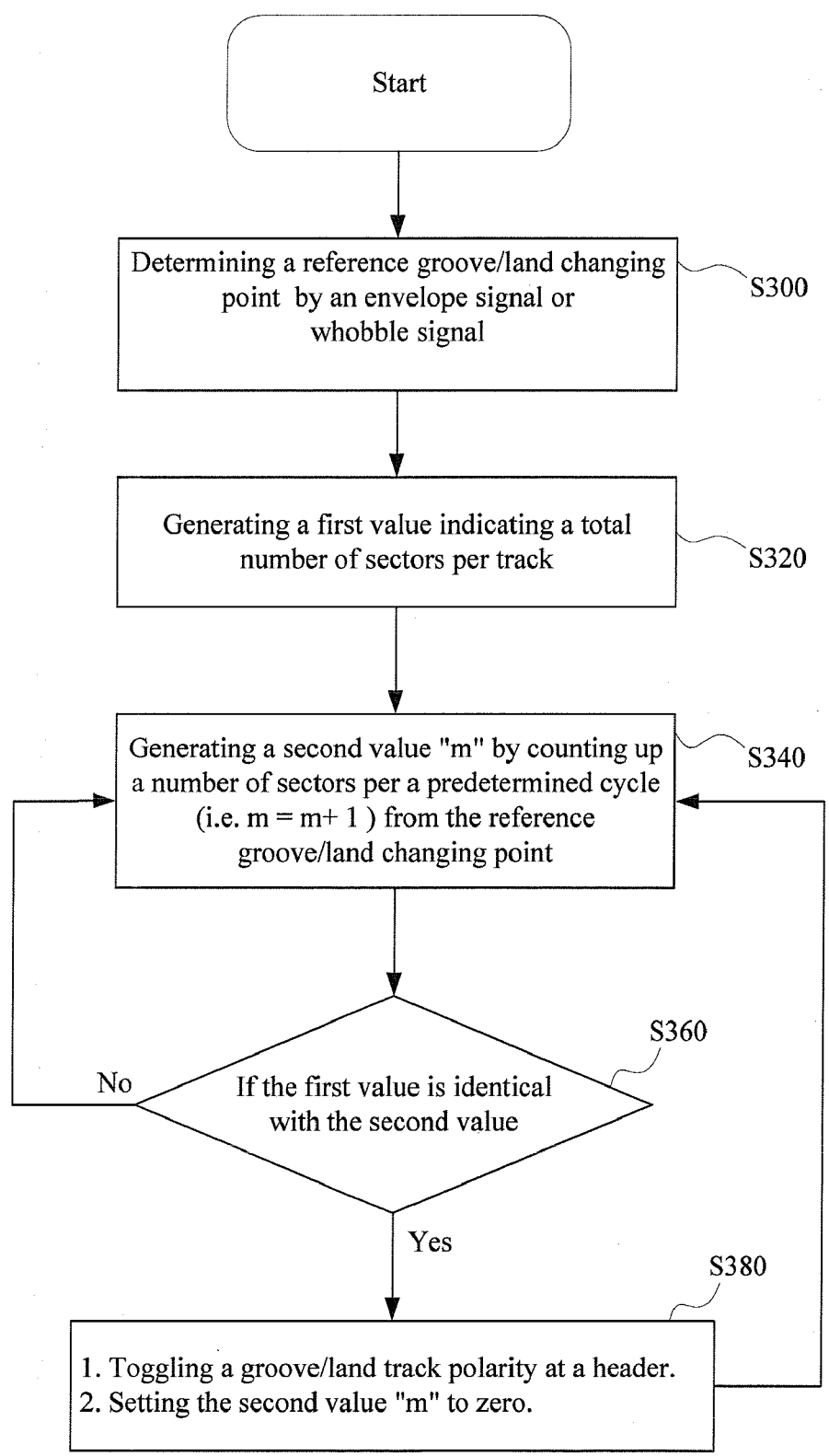
FIG. 3 is a flow chart of a track-polarity converting method according to the present invention.

Furthermore, a flow chart of a track-polarity converting method for toggling a groove/land polarity upon a groove/land track change on an optical medium is presented in FIG. 3, and comprises the following steps of:

In step S300, initially detecting a reference groove/land changing point formed on a zone laid on the optical medium, by a phase difference of an envelope signal (as shown in of FIG. 1a); in another case, counting cycles of the wobble signal to find out a reference groove/land changing point;

In step S320, generating a first value "N" indicating a total number of sectors per track according to the zone of the optical medium;

In step S340, generating a second value "m" by counting up a number of sectors per a predetermined cycle, from the reference groove/land changing point to approach a subsequent groove/land changing point, along the track where the reference groove/land changing point is located, wherein for example, if "m" is the number of counted sectors (or the second value) and initially set to zero, an equation of "m=m+1" denotes that the number of sectors is counted per the predetermined cycle by adding one sector to the previous second value; and In step S360, comparing the first value with the second value to determine a subsequent groove/land changing point formed on the optical medium, wherein if the first value is identical with the second value, it represents that the sector which being counted is a last sector arranged at the other end of the track where the reference groove/land changing point is located and neighbors on the subsequent groove/land changing point, and therefore going to step S380; and otherwise returning to step S340 for re-generating the second value by adding one sector to the number of sectors (i.e. "m=m+1") until the first value is identical with the second value;

In step S380, generating a groove/land converting signal for toggling a groove/land track polarity at a header area in a first sector of the next track, and setting the second value to zero (i.e. m=0) and then returning to the step S340 for re-generating the second value per predetermined cycle by counting up the number of sectors from the determined subsequent groove/land changing point until each oncoming groove/land changing point formed on the optical medium is found out one by one.

Figure 4:
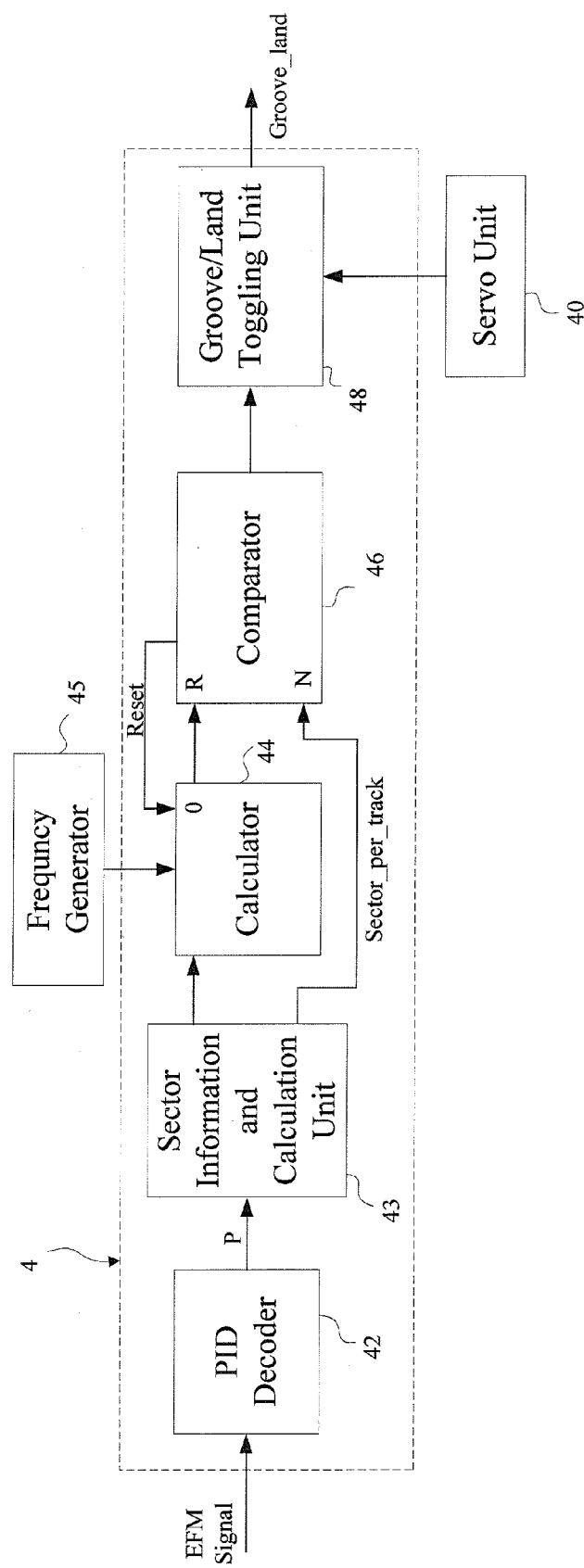
FIG. 4 is a block diagram of another track-polarity converting apparatus according to a second preferred embodiment of the present invention.

Further referring to FIG. 4, a track-polarity converting apparatus 4 according to a second preferred embodiment of the present invention for converting groove/land polarity responsive to a groove/land track change on an optical medium, comprises a physical identification data (PID) detector 42, a sector information and calculation unit 43, a calculator 44, a comparator 46 and a groove/land toggling unit 48.

By a microprocessor (MCU) or a DSP unit, a tracking control is performed for any one specific sector laid on the optical medium. Under a tracking-on status, the PID decoder 42 may decode an EFM (eight-to-fourteen modulation) signal from each specific sector laid on the optical medium into a specific physical identification (PID) value "P" indicating physical layout of the specific sector on the optical medium, and outputs the specific physical identification value "P" to the sector information unit 43. If the specific sector fails to be decoded successfully, the PID decoder 42 still continues to decode the next sector.

The sector information and calculation unit 43 includes a built-in lookup table and/or a remainder calculator. For a example, a lookup table for DVD-RAM shown in FIG. 5 pre-stores all sector information with regard to the optical medium, which predefines a physical relationship among sectors, tracks and zones laid on the optical medium, thereby determining an initial physical identification value "N" representing a foremost sector laid on a zone where the specific sector is located by using the specific physical identification value "P" to look up the table, and a first value "m" indicating a total number of sectors per track with reference to the zone via the table. The remainder calculator uses the initial physical identification value "N", the specific physical identification value "P", and the first value "m" to calculate a corresponding remainder as a second value "R", wherein the remainder denotes a number difference of sectors laid from the respective specific sector to approach a reference groove/land changing point along a track where the specific sector belongs. The number difference of sectors per calculation is set as a new second value "R". In another case, the sector information and calculation unit 43 may include a calculating circuit for calculating the total numbers of the sectors per track according to the zone where the specific sector belongs, by using the equations (a), (b) aforementioned in the first embodiment.

The remainder is calculated by using the first value "m" to divide a number difference of sectors "P−N" allocated between the specific physical identification value "P" and the initial physical identification value "N". For an example shown in FIG. 6, each "K" represents a decoded specific sector, "P" represents the specific physical identification value ("$P_1$" denotes a next PID value indicative to a sector neighboring on the specific sector), "N" represents the initial physical identification value, "m" represents the total number of sectors per track as the first value, and "R" represents a remainder value (as the number difference of sectors marked by a numerical reference 62) generated during calculation of a following equation (c) ("$R_1$" denotes a next remainder based on "$P_1$" wherein "MOD" represents a remainder mathematical function.

$$R = MOD((P-N), m) \qquad \text{equation (c)}$$

Thus, it is apparent in FIG. 6a that if the sequent specific sectors (K, $K_1$, ...) within a track are successfully decoded by the PID decoder 42, the calculator 44 will generate different second values respectively responsive to the decoded different specific sectors (K, $K_1$, ...), which are progressively far away from the same reference groove/land changing point 60 laid on the track but approach a subsequent groove/land changing point 66.

In another case shown in FIG. 7a, if any one of the sequent specific sectors (K, $K_1$, ...) fails to be decoded successfully, the calculator 44 will count up a new second value "R" relative to the decoded-fail specific sector by adding one to a previous second value (i.e. R=R+1).

Since the calculator 44 receives each second value "R" generated from the sector information and calculation unit 43 to approach a next reference groove/land changing point as a header area of a prima sector laid on a track (detailed later). If the PID detector 42 successfully detects a PID value of each specific sector, the calculator 44 will directly reload the second value "R" generated from the section information and calculation unit 43 for the specific sector, and then provide the second value "R" to the comparator 46.

Oppositely, if the PID detector 42 cannot continuously detect a PID value of a subsequent sector adjacent to the specific sector, the calculator 44 will count up the remainder by adding one to re-generate a next second value (i.e. R=R+1) responsive to the subsequent sector for supplying to the comparator 46. For more precious count, the remainder counting of the calculator 44 employs a predetermined cycle derived from a frequency generator 45, such as a phase-locked loop (PLL) circuit, which is synchronized with a wobble signal frequency or an EFM (eight-to-fourteen modulation) signal frequency.

The comparator 46 compares the first value with the second value per calculation to determine whether to enable the groove/land toggle unit 48 via the servo unit 40 to toggle a groove/land polarity in response to the subsequent groove/land changing point (as reference numeral 68 of FIG. 6f) on the optical medium. As soon as the second value is identical with a difference value of subtracting one from the first value (i.e. R=m−1), or with a PID value of a aftermost sector at an end of the track, it represents that the sector relative to the second value is the aftermost sector at an end of the track and is neighboring on the subsequent groove/land changing point. At this moment, the comparator 46 will enable the groove/land toggle unit 48 via the servo unit 40 to toggle a groove/land polarity in response to the subsequent groove/land changing point, and then set the second value "R" of the counter 44 to zero. However, after the second value relative to the specific sector is compared with the first value, regardless of whether the second value is identical with the difference value of subtracting one sector from the first value (i.e. R=m−1) or not, at least one subsequent sector adjacent to the specific sector is individually decoded by the PID decoder 42 for re-generating the second value until each oncoming groove/land changing point on the optical medium is found out one by one.

The groove/land toggling unit 48 generates a groove/land converting signal based on the enabling signal from the comparator 46 to toggle a groove/land polarity for the groove/land track change on the optical medium.

Figure 8:
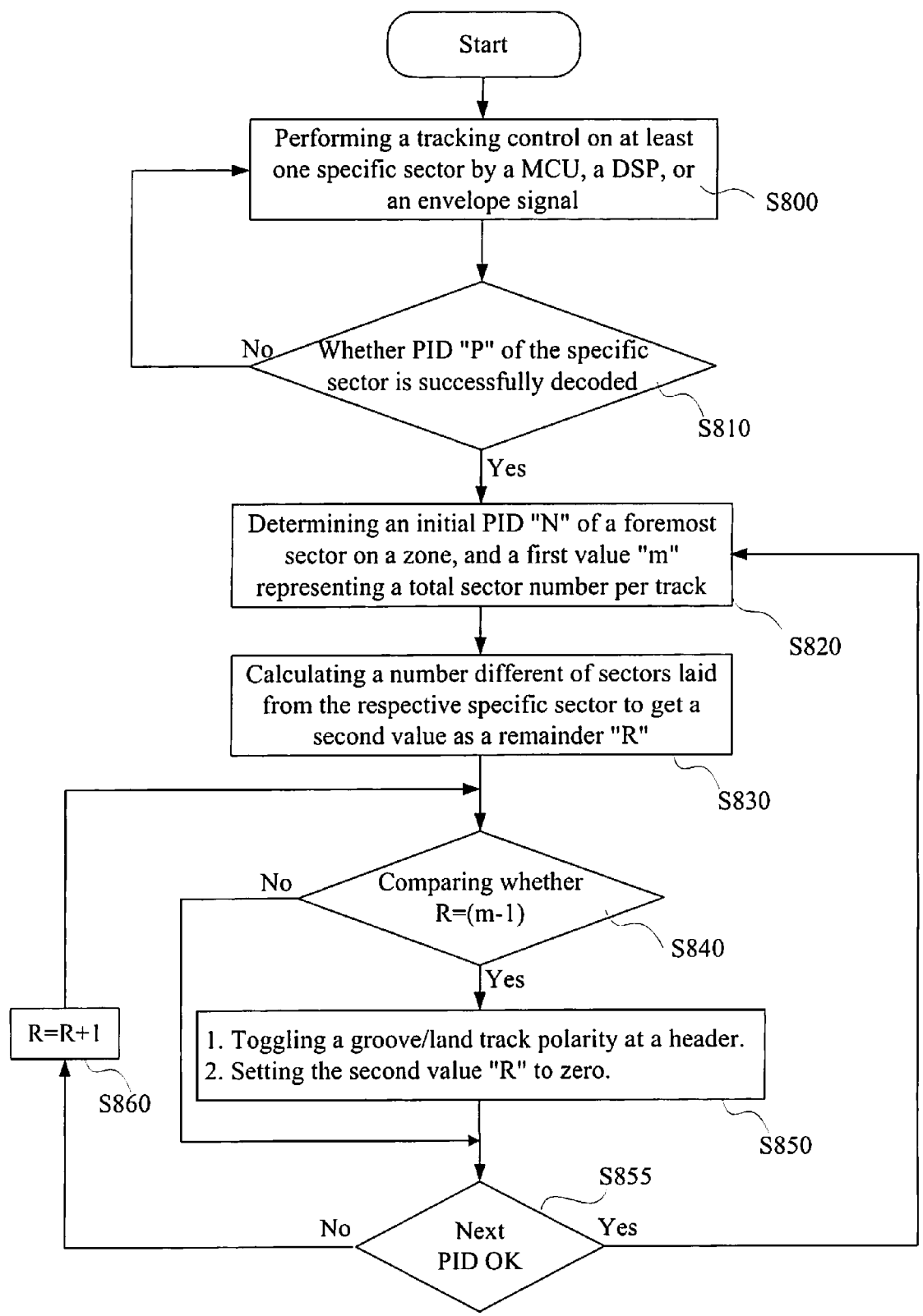
FIG. 8 is a flow chart illustrating another one track-polarity converting method according to the present invention.

Furthermore, a flow chart of a track-polarity converting method for toggling a groove/land polarity upon a groove/land track change on an optical medium is presented in FIG. 8, and comprises the following steps of In step S800, performing a tracking control (as a numerical reference 63 shown in FIG. 6b) on at least one specific sector on the optical medium by, for example, a microprocessor, a digital signal process unit, or a utilization of a phase difference of an envelope signal (as shown in FIGS. 1a & 1b);

In step S810, determining whether a specific physical identification value (as a reference "P" shown in FIG. 6d) indicating the physical layout of the specific sector (as a reference "K" shown in FIG. 6a) laid on the optical medium is successfully decoded or not; if so, performing the next step S820; and otherwise, returning to the step S800 as restarting a tracking control on the next sector (as a reference "$K_1$" shown in FIG. 6a);

In step S820, determining an initial physical identification (PID) value (as a reference "N" shown in FIG. 6a) representing a foremost sector on a zone where the specific sector belongs, and a first value indicating a total number of sectors per track (as a reference "m" shown in FIG. 6a) with reference to the zone, by using the decoded specific physical identification value to look up a built-in table (as shown in FIG. 5) which predefines a physical relationship among each sector, track and zone laid on the optical medium, wherein the total number of sectors per track may be calculated by said equations (a) and (b) in reference to the zone where the specific sector belongs;.

In step S830, using the initial physical identification value, the specific physical identification value, and the first value to calculate a number different of sectors laid from the respective specific sector to approach a reference groove/land changing point, along the track where the specific sector belongs, wherein the number difference of sectors per calculation based on a predetermined cycle is set to be a second value as a remainder value (as a reference "R" shown in FIG. 6e) of using the first value to divide a number difference of sectors laid between the specific physical identification value and the initial physical identification value (i.e. R=MOD ((P−N), m));

In step S840, comparing the first value with the second value per calculation to determine whether the second value is identical with a difference value of subtracting one sector from the first value (i.e. R=m−1) as shown in FIG. 6e), or with a PID value of a aftermost sector at en end of the track; if so, performing a step S850; and otherwise, performing a step S855;

In step S850, when the second value is identical with the difference value of subtracting one sector from the first value, it means that a specific sector relative to the second value (as a reference "m−1" of FIG. 6e) is as an aftermost sector arranged at an end of a track wherein the first specific sector is located and neighboring on a subsequent groove/land changing point (as a numerical reference 66 of FIG. 6a) on the optical medium, determining the subsequent groove/land changing point at a header area of a next track of the optical medium for converting a groove/land polarity (as a numerical reference 68 shown in FIG. 6e) in response to the groove/land track change (as a numerical reference 66 shown in FIG. 6a), and setting the second value to zero (i.e. R=0);

In step S855, continuously and individually setting (e.g. detecting and marking) each of the next sequent sectors (i.e. a reference "$K_1$" shown in FIG. 6a) adjacent to the specific sector (as a reference "K" shown in FIG. 6a) to approach the subsequent groove/land changing point, and determining whether the new specific sector (as the reference "$K_1$" is decoded successfully to achieve the corresponding physical identification data (as a reference "$P_1$" shown in FIG. 6d) or not; if so, further returning to the loop from the steps S820 to S850 to determine the corresponding second value (as a reference "$R_1$" shown in FIG. 6e), whereby each of the other oncoming groove/land changing points distributed on the optical medium can be sequentially found, by re-performing a loop from the steps S820 to S855;

In step S860, as long as the next sector (as the reference "$K_1$" shown in FIG. 7a) fails to be decoded successfully, calculating the corresponding second value (as a reference "R+1" shown in FIG. 7e) relative to the decoded-fail specific sector by adding one to a previous second value (as a reference "R" shown in FIG. 7e), and then returning to the step S840 until a sequent sector relative to the second value approaches or neighbors on the subsequent groove/land changing point (as the numerical reference 76 shown in FIG. 7a).

Figure 9:
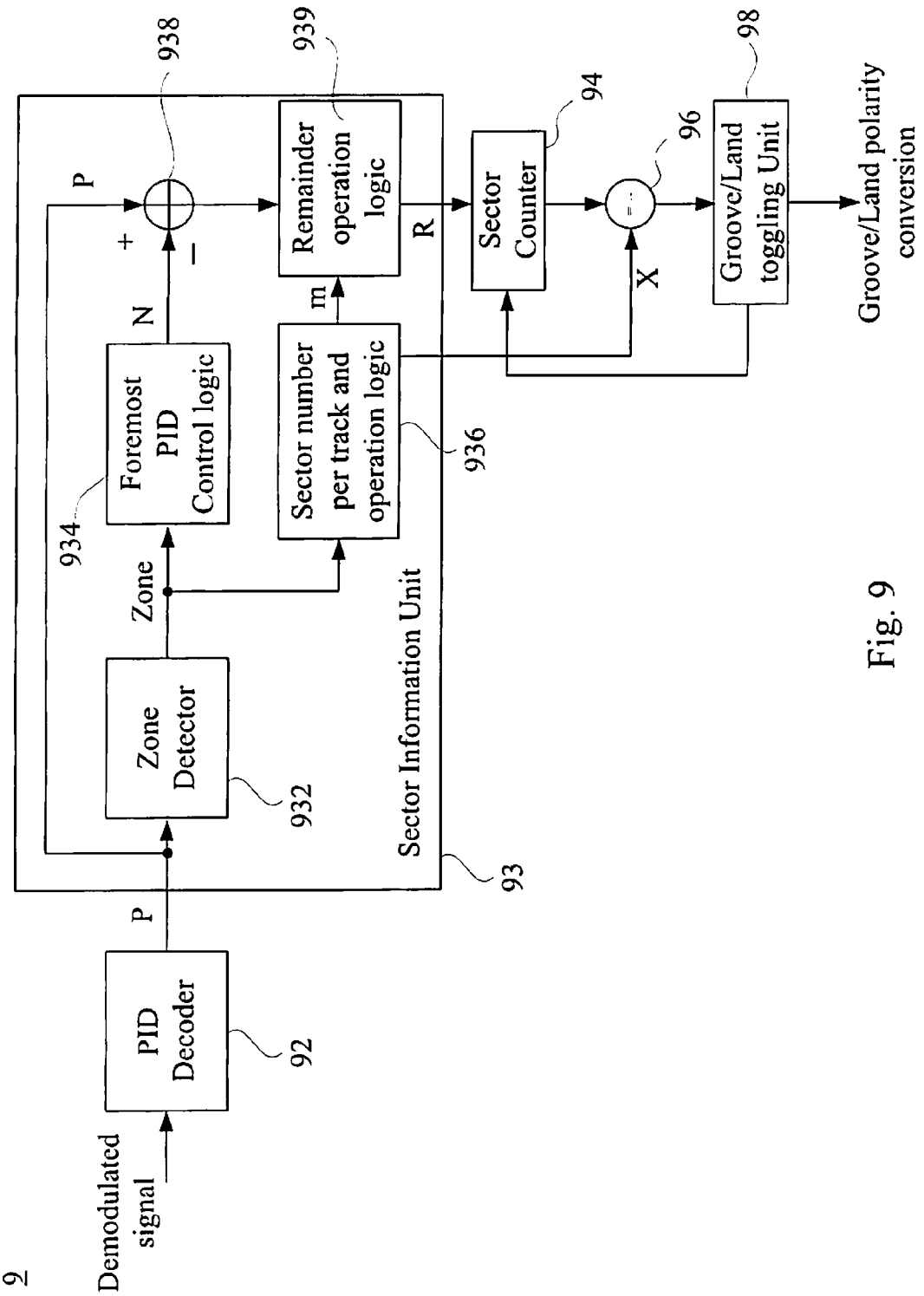
FIG. 9 is a block diagram of another track-polarity converting apparatus according to a third preferred embodiment of the present invention.

Further referring to FIG. 9, a track-polarity converting apparatus 9 according to a third preferred embodiment of the present invention for converting groove/land polarity responsive to respective groove/land track change on an optical medium, comprises a physical identification data (PID) detector 92, a sector information unit 93, a sector counter 94, a comparator 96 and a groove/land toggling unit 98.

By a microprocessor (MCU), a DSP unit or other likes, a tracking control is performed on any one specific sector laid on the optical medium, with accompanying the track-polarity converting apparatus 9. Under a tracking-on status, the PID decoder 92 decodes a modulated signal (e.g. an eight-to-fourteen modulation (EFM) signal) from each of specific sectors laid on the optical medium into a specific PID value "P" indicating a physical layout of the specific sector on the optical medium, and outputs the specific PID value "P" to the sector information unit 93. If failing to decode the specific sector, the PID decoder 92 still continues to decode the next specific sector.

The sector information unit 93 includes a zone detector 932, a foremost PID control logic 934, a sector number per track and operation logic 936, a subtracter 938 and a remainder operation logic 939, all or a part of which can be implemented in a circuitry or a software type.

The zone detector 932 determines a zone where the specific PID value "P" relative to the detected specific sector belongs and then outputs a sequent number of the determined zone. The foremost PID control logic 934 determines an initial PID value "N" representing a foremost sector laid on the determined zone where the detected specific sector is located and then outputs the initial PID value "N" for the subtracter 938.

The sector number per track and operation logic 936 determines a total number of sectors per track with reference to the determined zone, and then treats the total number of sectors per track to be a first value "m" output for the remainder operation logic 939, and additionally processes the first value "m" with a constant or variable to get a second value "X" output for the comparator 96. For example, on different demands, the second value "X" is set identical with the first value "m", a value "m−1" of subtracting a constant "1" from the first value "m" or a value "m−1−INI" of subtracting "1+INI" from the first value "m", wherein the first value "m" can be an integer or a non-integer, and the variable "INI" defines a presetting value as an initiating value or ending value of the sector counter 94.

In applications, the zone detector 932, the foremost PID control logic 934 and the sector number per track and operation logic 936 can be implemented on different ways. In an exemplar, the zone detector 932, the foremost PID control logic 934 and the sector number per track and operation logic 936 refers to a built-in lookup table as shown in FIG. 5, which pre-stores all sector information with regard to the optical medium and predefines a physical relationship among sectors, tracks and zones laid on the optical medium, and therefore determines the zone where the specific PID value "P" relative to the detected specific sector is located, the initial PID value "N" and the total number of sectors per track as the first value "m" with reference to the zone. In another exemplar, the zone detector 932 utilizes the aforementioned equations (a) to calculate a sequent number of the zone with referent to the specific PID value "P", and the sector number per track and operation logic 936 utilizes the aforementioned equations (b) to calculate the total numbers of the sectors per track as the first value "m" according to the zone.

The subtracter 938 is operative to calculate a number difference of sectors "P−N" allocated between the specific PID value "P" and the initial PID value "N".

The remainder operation logic 939 uses the first value "m" to divide the number difference of sectors "P−N" as performing the aforementioned equation (c) to get a corresponding remainder which is treated as a third value "R" and denotes a number difference of sectors laid between the detected specific sector to approach a oncoming reference groove/land changing point along a track where the specific sector belongs.

The sector counter 94 is operative to provide the comparator 96 with the third value "R", wherein the sector counter 94 directly reloads the third value "R" from the remainder operation logic 939 to the comparator 96 for each time when a PID value of respective specific sector is successfully detected, and then for each specific counting cycle continuously counts a new third value "R" as regenerating a new remainder relative to the next specific sector by adding one to a previous third value (i.e. R=R+1 as shown in FIG. 7e), regardless of whether a PID value of the next specific sector is successfully detected or not. The remainder "R" regenerated for each specific counting cycle is continuously supplied to the comparator 96 until approaching the second value "X" as approaching the oncoming reference groove/land changing point as a header area of a prima sector laid on a track. For precious count, the remainder counting of the sector counter 94 employs a predetermined cycle derived from a frequency generator, such as a phase-locked loop (PLL) circuit, which is synchronized with a wobble signal frequency or an EFM (eight-to-fourteen modulation) signal frequency.

The comparator 96 compares the third value "R" with the second value "X" per specific counting cycle to determine whether to enable the groove/land toggle unit 98 to toggle a groove/land polarity in response to the subsequent groove/land changing point (as reference numeral 68 of FIG. 6f) on the optical medium. Meanwhile, if the comparator 96 determines that the counted third value "R" approaches or is identical with the second value (i.e. X=m, m−1, or m−1−INI), it represents that the counted third value "R" approaches a PID value of a aftermost sector at an end of the track where the detected specific sector is located, and such a sector relative to the counted third value "R" can be regarded as the aftermost sector at the end of the track, which is neighboring on the subsequent groove/land changing point. At this moment, the comparator 96 will enable the groove/land toggle unit 98 to toggle a groove/land polarity in response to the subsequent groove/land changing point and to set initiation of the third value "R" of the sector counter 94 for restarting a new remainder counting and one-by-one finding other oncoming groove/land changing points.

For different applications, the third value "R" of the sector counter 94 can be selectively set to different integers or non-integers. For examples, the third "R" of the sector counter 94 is set to an "1" with response to when the second value is set as "X=m", the third value "R" of the sector counter 94 is set to an integer "0" with response to when the second value is set as "X=m−1", or the third value "R" of the sector counter 94 is set to a constant "INI" with response to when the second value is set as "X=m−1−INI". In other case, regardless of whether the third value "R" is identical with the second value (i.e. X=m, m−1 or m−1−INT) or not, at least one subsequent sector adjacent to the specific sector is individually decoded by the PID decoder 92 for re-generating the third value "R" until each oncoming groove/land changing point on the optical medium is found out one by one. When the third value "R" approaches the second value "X", it defines that a value difference between the third value "R" and the second value "X" meets a preset range or the third value "R" is identical with the second value "X".

Based on the enabling signal from the comparator 96, the groove/land toggling unit 98 generates a groove/land converting signal to toggle a groove/land polarity for the respective groove/land track changing points on the optical medium, and generates a setting signal to set the initiation of counting the remainder (as the third value "R") by the sector counter 94.

Figure 10:
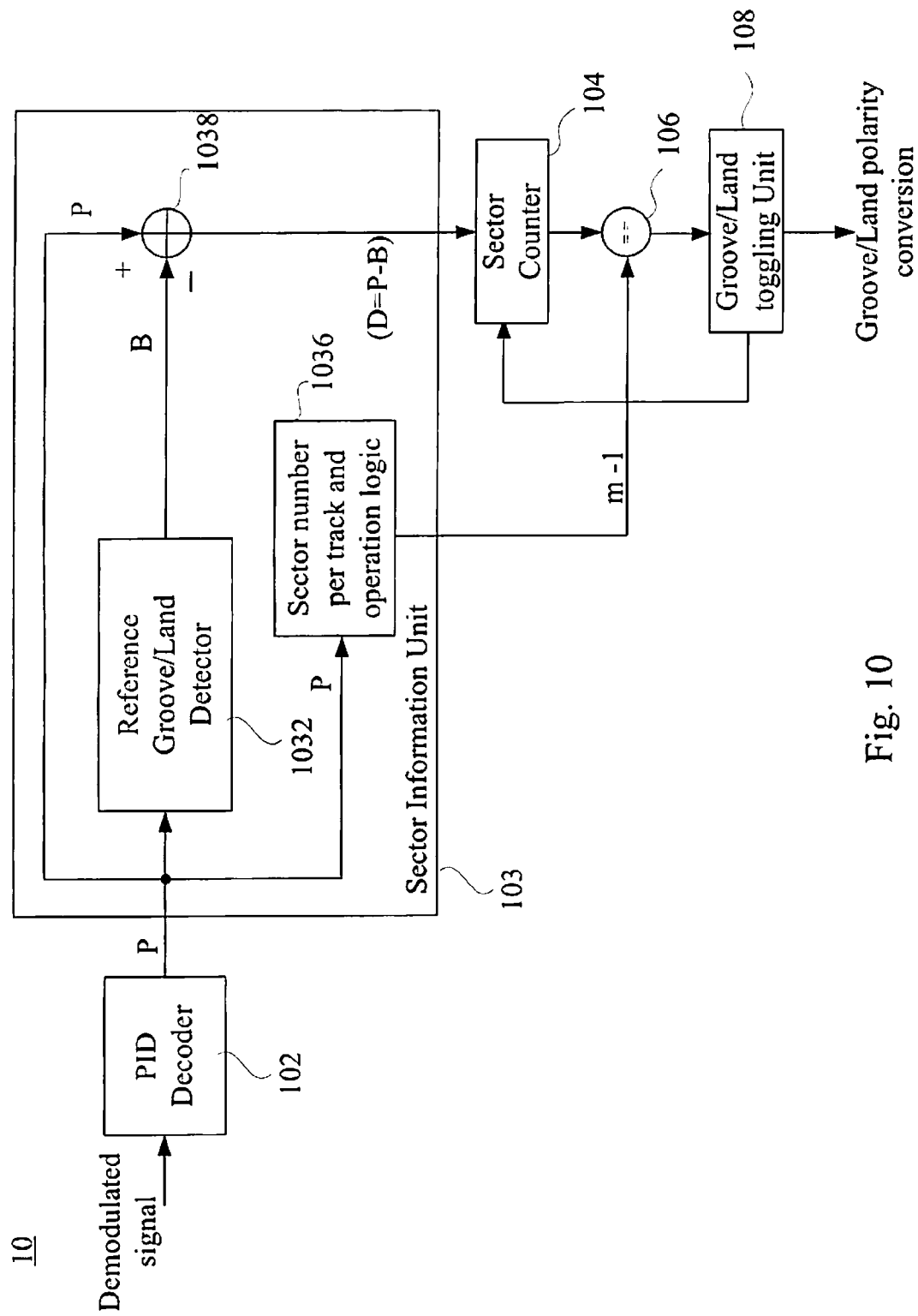
FIG. 10 is a block diagram of another track-polarity converting apparatus according to a fourth preferred embodiment of the present invention.

Further referring to FIG. 10, a track-polarity converting apparatus 10 according to a fourth preferred embodiment of the present invention for converting groove/land polarity responsive to respective groove/land track change on an optical medium, comprises a PID data (PID) detector 102, a sector information unit 103, a sector counter 104, a comparator 106 and a groove/land toggling unit 108.

Under a tracking-on status, the PID decoder 102 decodes a modulated signal (e.g. an eight-to-fourteen modulation (EFM) signal) from each of specific sectors laid on the optical medium into a specific PID (PID) value "P" indicating a physical layout of the detected specific sector on the optical medium, and outputs the specific PID value "P" to the sector information unit 103.

Differently from the third embodiment, the sector information unit 103 according to the fourth embodiment includes a reference groove/land detector 1032, a sector number per track and operation logic 1036 and a subtracter 1038, all or a part of which can be implemented in a circuitry or a software type. With reference to the specific PID value "P" of the detected specific sector, the reference groove/land detector 1032 determines a nearest groove/land changing point in front of the detected specific sector and then outputs a PID value "B" of the nearest groove/land changing point for the subtracter 1038, and the sector number per track and operation logic 1036 determines a total number of sectors per track where the detected specific sector belongs, and then treats the total number of sectors per track to be a first value "m" and subtract "1" from the first value "m" to get a second value "m−1", as a PID value of an aftermost sector at an end of the track where the detected specific sector is located, output for the comparator 106.

For applications, the reference groove/land detector 1032 and the sector number per track and operation logic 1036 can be implemented on different ways. In an exemplar, the reference groove/land detector 1032 and the sector number per track and operation logic 1036 refers to a built-in lookup table as shown in FIG. 5, which pre-stores all sector information with regard to the optical medium and predefines a physical relationship among sectors, tracks and zones laid on the optical medium, and therefore determines the PID value "B" of the nearest groove/land changing point and the total number of sectors per track as the first value "m" with reference to the specific PID value "P". In another exemplar, the reference groove/land detector 1032 utilizes the aforementioned equations (a) to calculate a sequent number of the zone with referent to the specific PID value "P" and calculate the PID value "B" of the nearest groove/land changing point in front of the specific PID value "P" in the zone, and the sector number per track and operation logic 1036 utilizes the aforementioned equations (b) to calculate the total numbers of the sectors per track as the first value "m" according to the zone.

The subtracter 1038 is operative to calculate a number difference "P−B" of the sectors allocated between the specific PID value "P" and the PID value "B" of the nearest groove/land changing point and treats the number difference "P−B" of the sectors as a third value (i.e. D=P−B) output for the sector counter 104, wherein the third "D" can be an integer or a non-integer.

The sector counter 104 is operative to provide the comparator 106 with the third value "D", wherein the sector counter 104 directly loads the third value "D" from the subtracter 1038 to the comparator 106 for each time when a PID value of respective specific sector is successfully detected, and then for each specific counting cycle continuously counts a new third value "D" relative to the next specific sector by adding one to a previous third value (i.e. D=D+1), regardless of whether a PID value of the next specific sector is successfully detected or not. The third value "D" regenerated for each specific counting cycle is continuously supplied to the comparator 106 until approaching the second value "m−1" as approaching an oncoming reference groove/land changing point as a header area of a prima sector laid on a track. For precious count, the counting of the sector counter 104 employs a predetermined cycle derived from a frequency generator, such as a phase-locked loop (PLL) circuit, which is synchronized with a wobble signal frequency or an EFM (eight-to-fourteen modulation) signal frequency.

The comparator 106 compares the third value "D" with the second value "m−1" per specific counting cycle to determine whether to enable the groove/land toggle unit 108 to toggle a groove/land polarity in response to the subsequent groove/land changing point (as reference numeral 68 of FIG. 6f) on the optical medium. Meanwhile, if the comparator 106 determines that the counted third value "D" approaches or is identical with the second value "m−1", it represents that the counted third value "D" approaches the PID value "m−1" of the aftermost sector at the end of the track where the detected specific sector is located, and such a sector relative to the counted third value "D" can be regarded as the aftermost sector at the end of the track, which is neighboring on the subsequent groove/land changing point. At this moment, the comparator 106 will enable the groove/land toggle unit 108 to toggle a groove/land polarity in response to the subsequent groove/land changing point and to set the initiation of counting the third value "D" by the sector counter 104 into zero for restarting a new counting and one-by-one finding other oncoming groove/land changing points on the optical medium. When the third value "D" approaches the second value "m−1", it defines that a value difference between the third value "D" and the second value "m−1" meets a preset range or the third value "D" is identical with the second value "m−1".

In other case, regardless of whether the third value "D" is identical with the second value "m−1" or not, at least one subsequent sector adjacent to the detected specific sector is individually decoded by the PID decoder 102 for re-generating the third value "D" until each oncoming groove/land changing point on the optical medium is found out one by one.

Based on the enabling signal from the comparator 106, the groove/land toggling unit 108 generates a groove/land converting signal to toggle a groove/land polarity for the respective groove/land track changing points on the optical medium, and generates a setting signal to set the initiation of countering the third value "D" by the sector counter 104.

Figure 11:
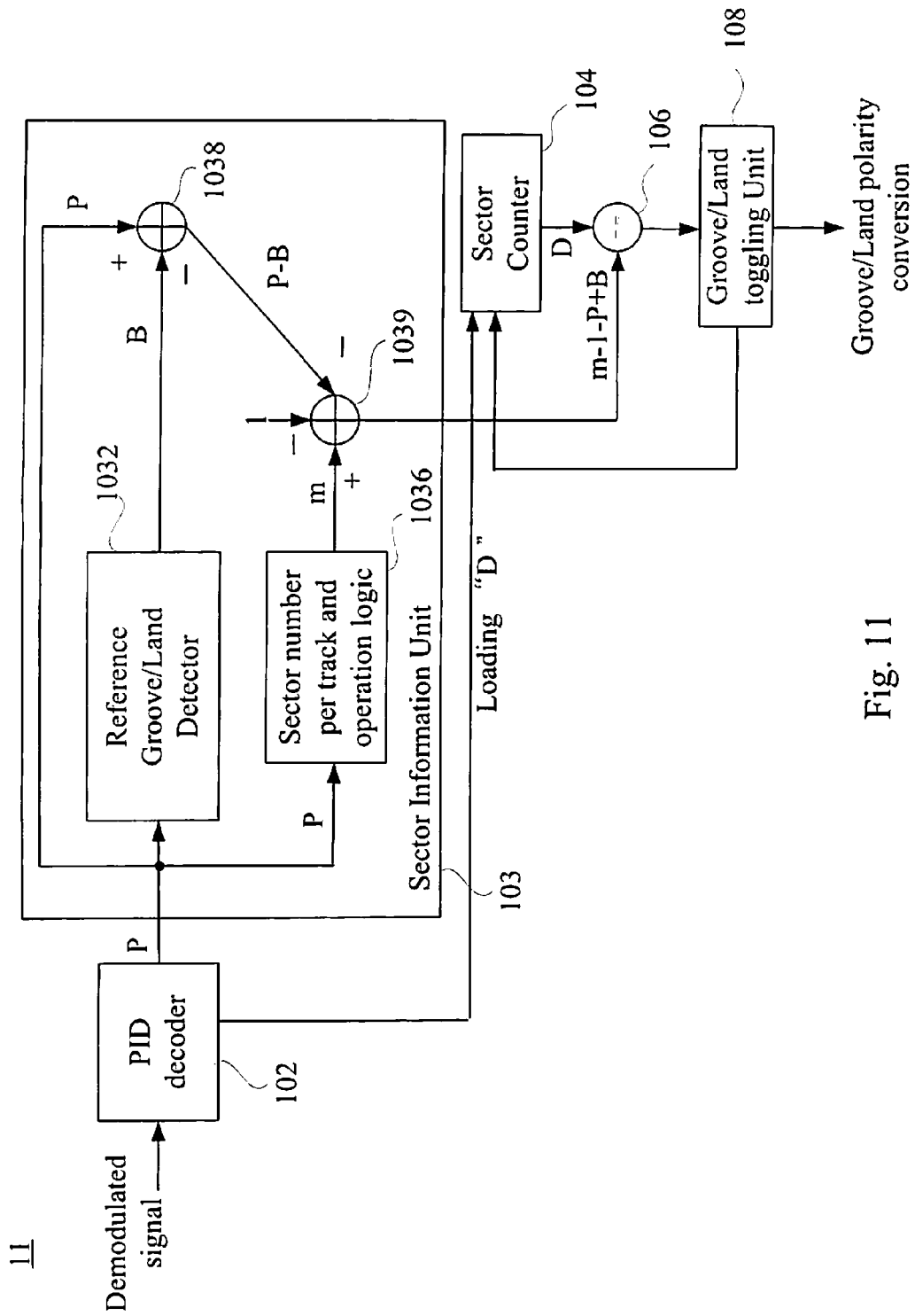
FIG. 11 is a block diagram of another track-polarity converting apparatus according to a fifth preferred embodiment of the present invention.

Further referring to FIG. 11, a track-polarity converting apparatus 11 according to a fifth preferred embodiment of the present invention is similar to the above-mentioned fourth embodiment, except for several differences as followings. In the fifth embodiment, the PID decoder 102 decodes the specific PID value "P", outputs the specific PID value "P" to the sector information unit 103, and also loads a value "0" to be an initiation for counting of the sector counter 104. If failing to decode the specific sector, the PID decoder 102 still continues to decode the next specific sector and does not set initiation of the sector counter 104.

Compared from the fourth embodiment, the sector information unit 103 according to the fifth embodiment, except for a first subtracter 1038, adds a second subtracter 1039 where the sector number per track and operation logic 1036 outputs the first value "m".

The first subtracter 1038 is operative to output the front number difference of sectors "P−B" for the second subtracter 1039. Then, the second subtracter 1039 is operative to calculate a rear number difference of sectors treated as a second value "m−1P+B", between the specific PID value "P" and a PID value "m−1" indicative of an aftermost sector at an end of the track where the detected specific sector is located, by way of subtracting the front number difference of sectors "P−B" from the PID value "m−1" of the aftermost sector at the end of the track, and output the second value "m−1P+B" for the comparator 106.

The sector counter 104 is operative to provide the comparator 106 with a third value "D", wherein the sector counter 104 directly loads the value "0" from the PID detector 102 to be an initiation of counting the third value "D" for each time when a PID value of respective specific sector is successfully detected, and then for each specific counting cycle continuously counts a new third value "D" relative to the next specific sector by adding one to a previous third value (i.e. D=D+1), regardless of whether a PID value of the next specific sector is successfully detected or not. The third value "D" generated for each specific counting cycle is continuously supplied to the comparator 106 until approaching the second value "m−1−P+B" as approaching an oncoming reference groove/land changing point as a header area of a prima sector laid on a track.

The comparator 106 compares the third value "D" with the second value "m−1−P+B" per specific counting cycle to determine whether to enable the groove/land toggle unit 108 to toggle a groove/land polarity in response to the subsequent groove/land changing point (as reference numeral 68 of FIG. 6f) on the optical medium. Meanwhile, if the comparator 106 determines that the third value "D" approaches or is identical with the second value "m−1−P+B", it represents that the aftermost sector at the end of the track where the detected specific sector is located is approached, which is neighboring on the subsequent groove/land changing point. At this moment, the comparator 106 will enable the groove/land toggle unit 108 to toggle a groove/land polarity in response to the subsequent groove/land changing point and to set the initiation of counting the third value "D" by the sector counter 104 into zero for restarting a new counting and one-by-one finding other oncoming groove/land changing points on the optical medium. When the third value "D" approaches the second value "m−1−P+B", it defines that a value difference between the third value "D" and the second value "m−1−P+B" meets a preset range or the third value "D" is identical with the second value "m−1−P+B".

In other case, regardless of whether the counted third value "D" approaches or is identical with the second value "m−1−P+B" or not, at least one subsequent sector adjacent to the detected specific sector is individually decoded by the PID decoder 102 for re-generating the third value "D" until each oncoming groove/land changing point on the optical medium is found out one by one.

Figure 12:
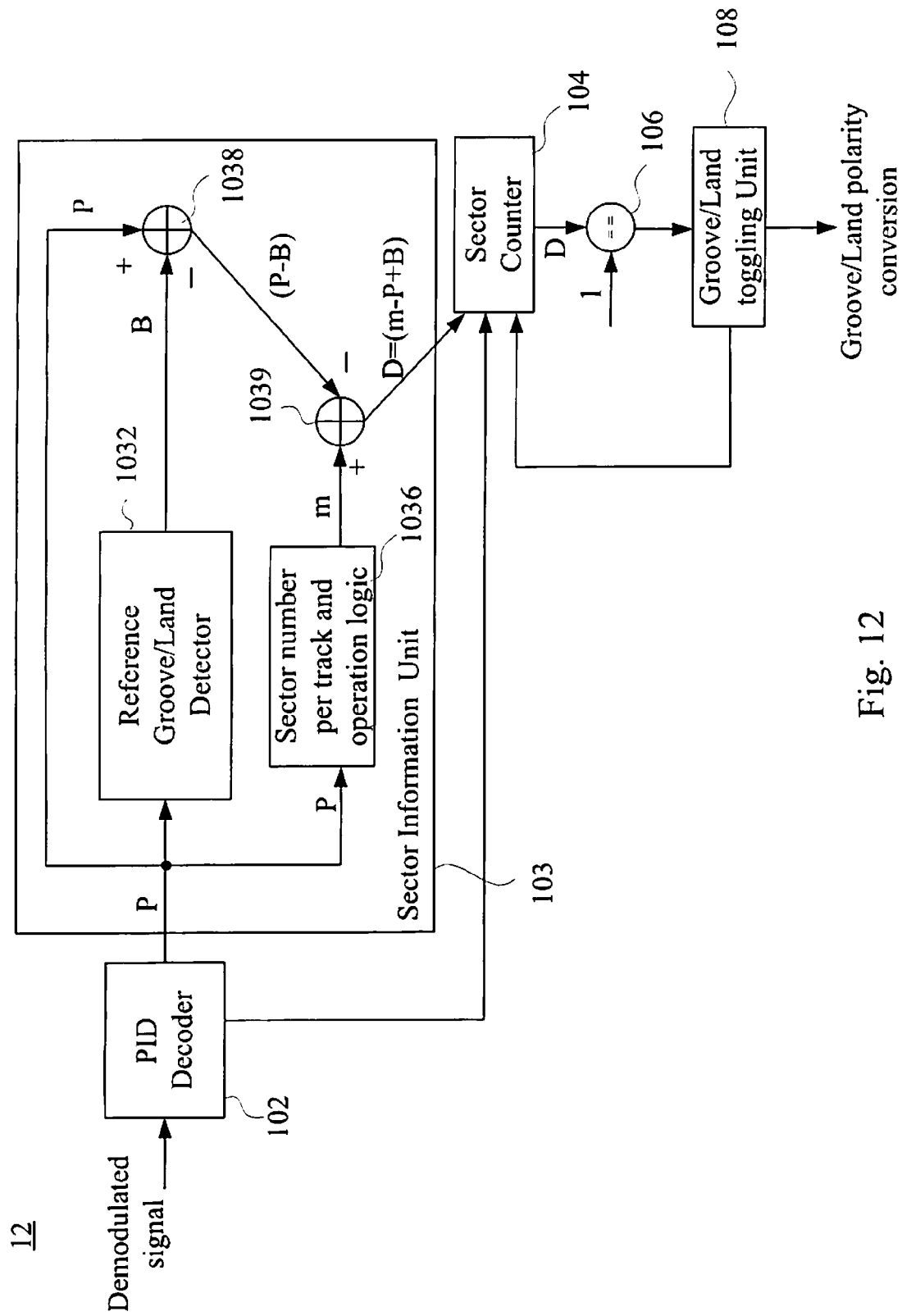
FIG. 12 is a block diagram of another track-polarity converting apparatus according to a sixth preferred embodiment of the present invention.

Further referring to FIG. 12, a track-polarity converting apparatus 12 according to a sixth preferred embodiment of the present invention is similar to the above-mentioned fifth embodiment, except for several differences as followings.

In the sixth embodiment, the PID decoder 102 decodes the specific PID value "P", outputs the specific PID value "P" to the sector information unit 103, and also loads the sector counter 104 for setting an initiation of the sector counter 104.

The second subtracter 1039 is operative to output the third value (i.e. D=m-P+B) for the sector counter 104. The sector counter 104 is operative to provide the comparator 106 with the third value "D", wherein the sector counter 104 is enabled by the PID detector 102 to directly load the third value (i.e. D−m−P+B) from the second subtracter 1039 to be an initiation of counting down the third value "D" for each time when a PID value of respective specific sector is successfully detected, and then for each specific counting cycle continuously counts down a new third value "D" by subtracting one from a previous third value (i.e. D=D−1), regardless of whether a PID value of the next specific sector is successfully detected or not. The third value "D" for each specific counting-down cycle is continuously supplied to the comparator 106 until approaching the second value "1" as approaching an oncoming reference groove/land changing point as a header area of a prima sector laid on a track.

The comparator 106 has a constant "1" input treated as a second value and compares the third value "D" with the second value "1" per specific counting cycle to determine whether to enable the groove/land toggle unit 108 to toggle a groove/land polarity in response to the subsequent groove/land changing point (as reference numeral 68 of FIG. 6f) on the optical medium. Meanwhile, if the comparator 106 determines that the third value "D" approaches or is identical with the second value "1", it represents that the aftermost sector at the end of the track where the detected specific sector is located is approached, which is neighboring on the subsequent groove/land changing point. At this moment, the comparator 106 will enable the groove/land toggle unit 108 to toggle a groove/land polarity in response to the subsequent groove/land changing point and to set the initiation of counting down the third value "D" by the sector counter 104 to be the first value "m" for restarting a new countdown and one-by-one finding other oncoming groove/land changing points on the optical medium. When the third value "D" approaches the second value "1", it denotes that a value difference between the third value "D" and the second value "1" meets a preset range or the third value "D" is identical with the second value "1".

Based on the enabling signal from the comparator 106, the groove/land toggling unit 108 generates a groove/land converting signal to toggle a groove/land polarity for the respective groove/land track changing points on the optical medium, and generates a setting signal to set the initiation of countering down the third value "D" by the sector counter 104, as the first value "m".

Figure 13:
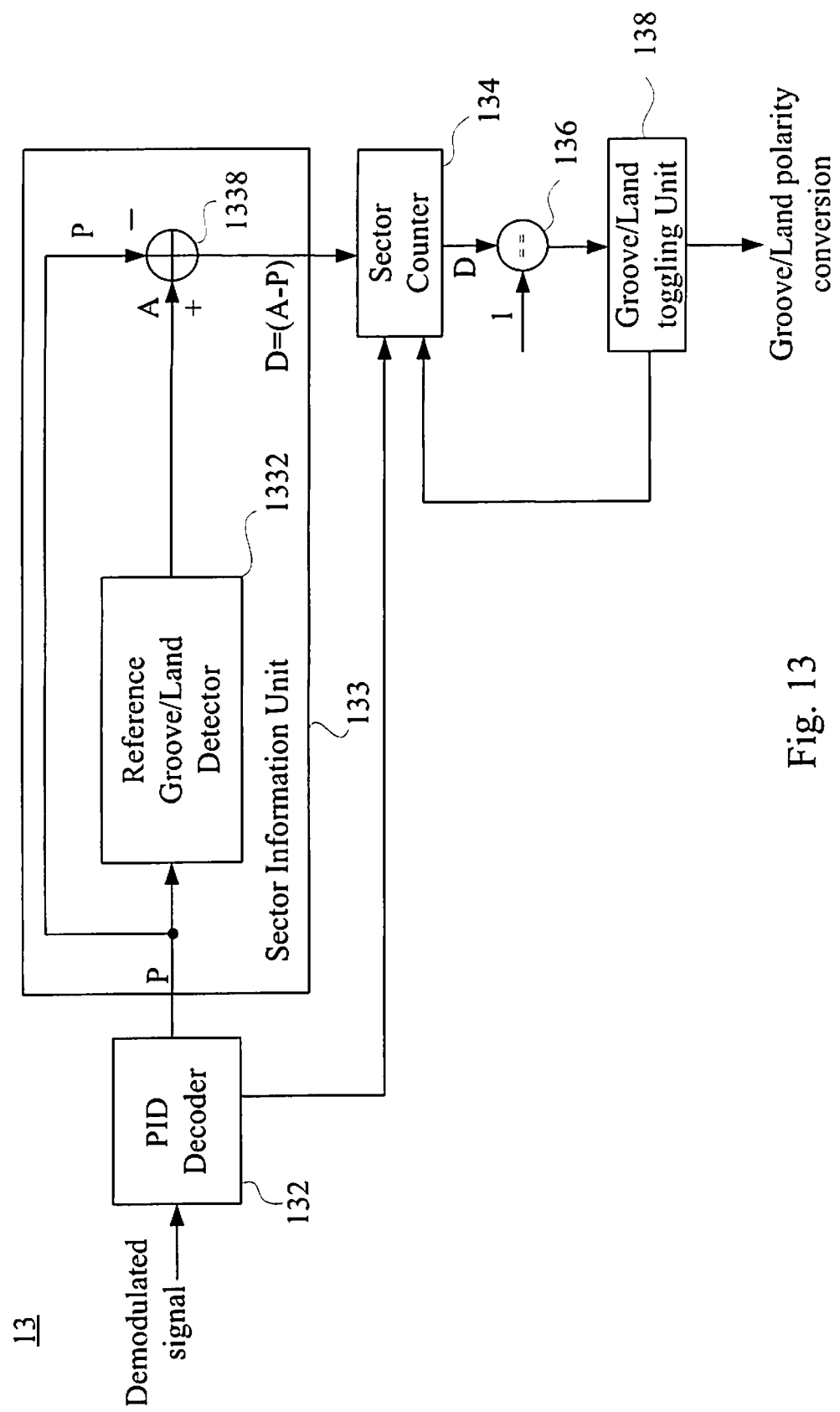
FIG. 13 is a block diagram of another track-polarity converting apparatus according to a seventh preferred embodiment of the present invention.

Further referring to FIG. 13, a track-polarity converting apparatus 13 according to a seventh preferred embodiment of the present invention, comprises a PID detector 132, a sector information unit 133, a sector counter 134, a comparator 136 and a groove/land toggling unit 138.

In the seventh embodiment, the PID decoder 132 decodes the specific PID value "P", outputs the specific PID value "P" to the sector information unit 133, and also loads the sector counter 134 for setting an initiation of the sector counter 134. If failing to decode the specific sector, the PID decoder 132 still continues to decode the next specific sector and does not set initiation of the sector counter 134.

The sector information unit 133 according to the seventh embodiment merely includes a reference groove/land detector 1332 and a subtracter 1338. With reference to the specific PID value "P" of the detected specific sector, the reference groove/land detector 1332 determines a nearest groove/land changing point behind the detected specific sector and then outputs a PID value "A" indicative of the nearest groove/land changing point for the subtracter 1338. The subtracter 1338 is operative to calculate a rear number difference of sectors "A−P" allocated between the specific PID value "P" and the PID value "A" of the nearest groove/land changing point and treats the rear number difference of sectors "A−P" as a third value (i.e. D=A−P) output for the sector counter 134.

The sector counter 134 is operative to provide the comparator 136 with the third value "D", wherein the sector counter 134 is enabled by the PID detector 132 to directly load the third value (i.e. D=A−P) from the subtracter 1338 to be an initiation of counting down the third value "D" for each time when a PID value of respective specific sector is successfully detected, and then for each specific counting cycle continuously counts down a new third value "D" by subtracting one from a previous third value (i.e. D=D−1), regardless of whether a PID value of the next specific sector is successfully detected or not. The third value "D" for each specific counting-down cycle is continuously supplied to the comparator 136 until approaching the second value "1" as approaching an oncoming reference groove/land changing point as a header area of a prima sector laid on a track.

The comparator 136 has a constant "1" input treated as a second value and compares the third value "D" with the second value "1" per specific counting-down cycle to determine whether to enable the groove/land toggle unit 138 to toggle a groove/land polarity in response to the subsequent groove/land changing point (as reference numeral 68 of FIG. 6f) on the optical medium and to set the initiation of counting down the third value "D" by the sector counter 134 for restarting a new countdown and one-by-one finding other oncoming groove/land changing points on the optical medium. When the third value "D" approaches the second value "1", it defines that a value difference between the third value "D" and the second value "1" meets a preset range or the third value "D" is identical with the second value "1".

Figure 14:
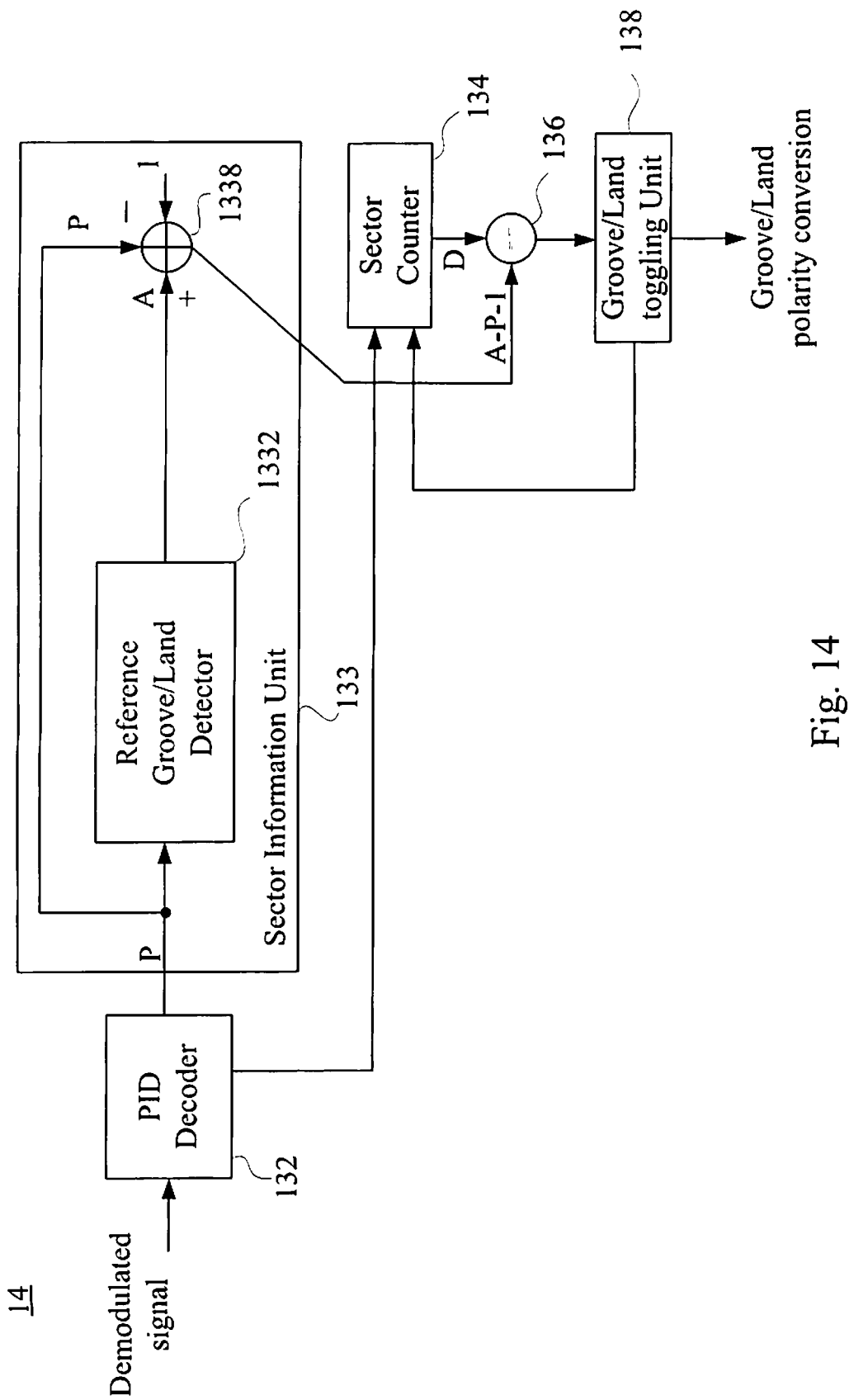
FIG. 14 is a block diagram of another track-polarity converting apparatus according to an eighth preferred embodiment of the present invention.

Further referring to FIG. 14, a track-polarity converting apparatus 14 according to an eighth preferred embodiment of the present invention is similar to the above-mentioned seventh embodiment, except for several difference as following. In the eighth embodiment, the subtracter 1338 is operative to calculate a rear number difference of sectors between the detected specific sector having the specific PID value "P" and an aftermost sector at an end of a track where the detected specific sector is located, by way of subtracting "1" from a longer number difference of sectors "A−P" allocated between the specific PID value "P" and the PID value "A" of the nearest groove/land changing point, and treats the rear number difference of sectors "A−P−1" as a second value output for the comparator 136.

The sector counter 134 is operative to provide the comparator 136 with a third value "D", wherein the sector counter 134 is enabled by the PID detector 132 to directly load a value "0" to be the third value "D" as an initiation of counting up the third value "D" for each time when a PID value of respective specific sector is successfully detected, and then for each specific counting cycle continuously counts up a new third value "D" by adding one to a previous third value (i.e. D=D+1). The third value "D" for each specific counting cycle is continuously supplied to the comparator 136 until approaching the second value "A−P−1" as approaching an oncoming reference groove/land changing point as a header area of a prima sector laid on a track.

The comparator 136 compares the third value "D" with the second value "A−P−1" per specific counting cycle to determine whether to enable the groove/land toggle unit 138 to toggle a groove/land polarity in response to the subsequent groove/land changing point (as reference numeral 68 of FIG. 6f) on the optical medium and to set the initiation of counting up the third value "D" by the sector counter 134 for restarting a new counting and one-by-one finding other oncoming groove/land changing points on the optical medium. When the third value "D" approaches the second value "A−P−1", it defines that a value difference between the third value "D" and the second value "A−P−1" meets a preset range or the third value "D" is identical with the second value "A−P−1".

Figure 15:
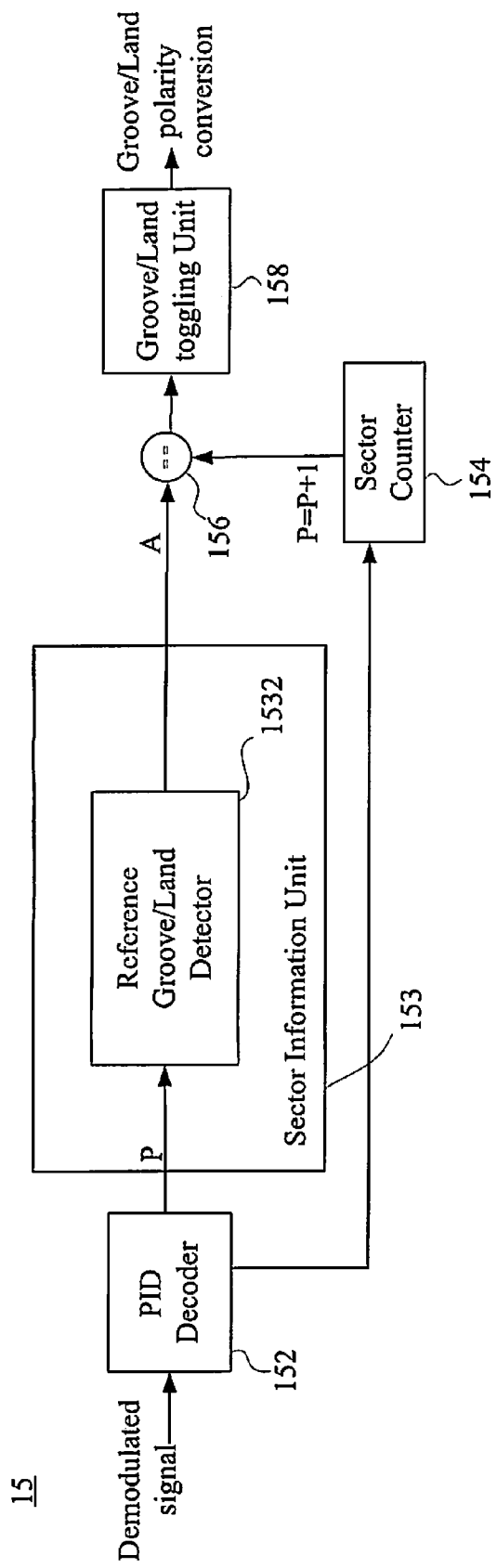
FIG. 15 is a block diagram of another track-polarity converting apparatus according to a ninth preferred embodiment of the present invention.

Further referring to FIG. 15, a track-polarity converting apparatus 15 according to a ninth preferred embodiment of the present invention comprises a PIDdetector 152, a sector information unit 153, a sector counter 154, a comparator 156 and a groove/land toggling unit 158.

The PID decoder 152 decodes the specific PIDvalue "P", outputs the specific PID value "P" to the sector information unit 153, and also loads the specific PID value "P to the sector counter 154 for setting an initiation of the sector counter 154 to be counted. If failing to decode the specific sector, the PID decoder 152 still continues to decode the next specific sector and does not set initiation of the sector counter 154.

Differently from the eighth embodiment, the sector information unit 153 according to the ninth embodiment merely includes a reference groove/land detector 1532. With reference to the specific PID value "P" of the detected specific sector, the reference groove/land detector 1532 determines a nearest groove/land changing point behind the detected specific sector and then directly outputs a PID value "A" indicative of the nearest groove/land changing point for the comparator 156.

The sector counter 154 is operative to provide the comparator 156 with a third value as the specific PID value "P", wherein the sector counter 154 is enabled by the PID detector 152 to directly load the specific PID value "P" to be the third value as an initiation of counting up the third value "P" for each time when a PID value of respective specific sector is successfully detected, and then for each specific counting cycle continuously counts up a new third value "P" by adding one to a previous third value (i.e. P=P+1). The third value "P" for each specific counting cycle is continuously supplied to the comparator 156 until approaching the second value "A" as approaching the nearest reference groove/land changing point behind the detected specific sector.

The comparator 156 compares the third value "P" with the second value "A" per specific counting cycle to determine whether to enable the groove/land toggle unit 158 to toggle a groove/land polarity in response to the subsequent groove/land changing point (as reference numeral 68 of FIG. 6f) on the optical medium. When the third value "P" approaches the second value "A", it defines that a value difference between the third value "P" and the second value "A" meets a preset range or the third value "P" is identical with the second value "A".

In other case, regardless of whether the counted-up third value "P" is identical with the second value "A" or not, at least one subsequent sector adjacent to the detected specific sector is individually decoded by the PID decoder 152 for re-generating the third value "P" until each oncoming groove/land changing point on the optical medium is found out one by one.

Figure 16:
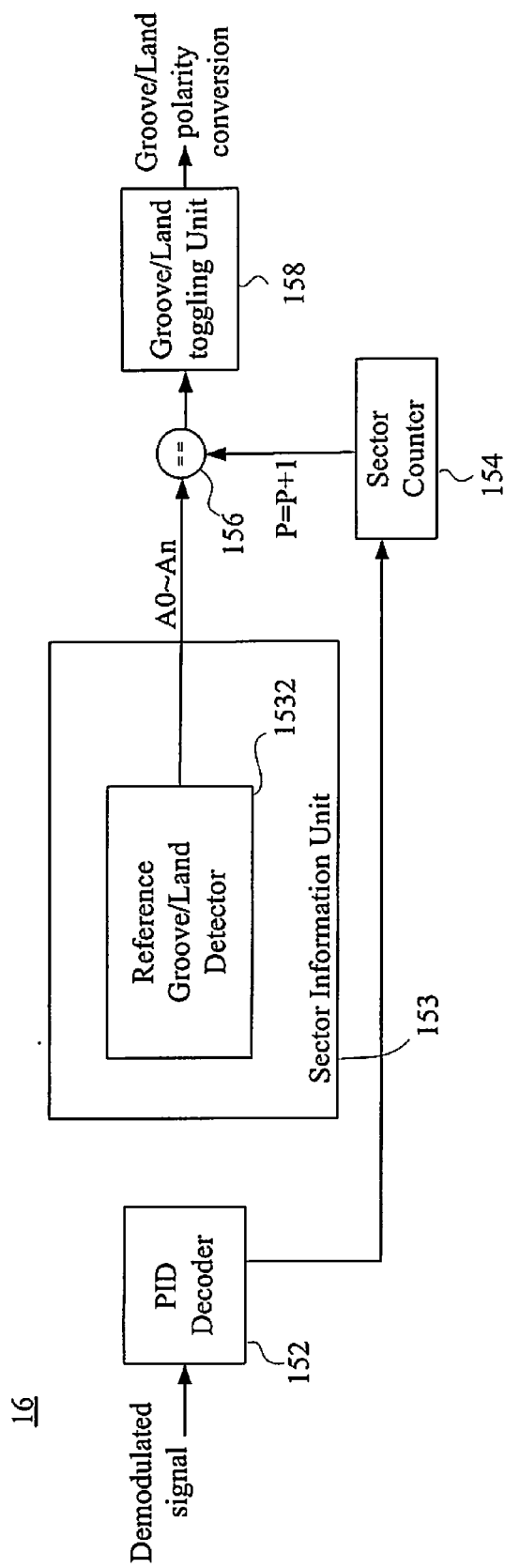
FIG. 16 is a block diagram of another track-polarity converting apparatus according to a tenth preferred embodiment of the present invention.

Further referring to FIG. 16, a track-polarity converting apparatus 16 according to a tenth preferred embodiment of the present invention is similar to the above-mentioned ninth embodiment, except for several differences as following.

In the tenth embodiment, the PID decoder 152 decodes the specific PID value "P", and merely loads the specific PID value "P treated as a first value to the sector counter 154 for setting an initiation of the count by the sector counter 154. The reference groove/land detector 1532 determines all groove/land changing points allocated on the optical medium and then respectively outputs all PID values "A0~An" indicative of all of the groove/land changing points, treated as a plurality of second values for the comparator 156.

The sector counter 154 is operative to provide the comparator 156 with first value "P", wherein the sector counter 154 is enabled by the PID detector 152 to directly load the specific PID value "P" as the first value "P" to be the initiation of counting up the first value "P" for each time when a PID value of respective specific sector is successfully detected, and then for each specific counting cycle continuously counts up a new first value "P" by adding one to a previous first value (i.e. P=P+1), regardless of whether a PID value of the next specific sector is successfully detected or not. The first value "P" for each specific counting cycle is continuously supplied to the comparator 156 until approaching any one of the second values "A0~An" as one-by-one approaching each of all of the reference groove/land changing points on the optical medium.

The comparator 156 compares the third value "P" with the second value "A0~An" per specific counting cycle to determine whether to enable the reference groove/land toggle unit 158 to toggle a groove/land polarity in response to each of thegroove/land changing points allocated on the optical medium. When the third value "P" approaches any one of the second values "A0~An", it defines that a value difference between the third value "P" and any one of the second values "A0~An" meets a preset range or the third value "P" is identical with one of the second values "A0~An".

In conclusion, the track-polarity converting apparatus and method according to the embodiments of the present invention are capable of initially seeking a reference groove/land changing point or utilizing any one decoded PID value of a sector laid on an optical medium to determine each subsequent groove/land changing point distributed on the optical medium for timely converting a groove/land polarity. Therefore, the apparatus and method of the present invention can implements a recording/reading process on the optical medium, especially for one kind of optical medium, i.e. DVD-RAM, which must use exact groove/land information to perform a tracking control. Also, the present invention does not need to successively check the PID data (PID) of most of the last sectors in a track as the aforementioned prior art. In other embodiments, by way of initially finding out a relationship between a first PID value of a first sector decoded and a second PID value of either a second sector provided or a reference groove/land changing point formed on the optical medium, the apparatus according to the present invention is capable of easily approaching each of oncoming groove/land changing points on the optical medium for converting the groove/land polarity.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An apparatus for converting a groove/land polarity upon a groove/land track change on an optical medium, comprising:
    a physical identification (PID) detector detecting a first sector from the optical medium into a first PID value;
    a sector information unit providing an information relative to the optical medium, including a second PID value indicative of either a second sector or at least one reference groove/land changing point laid on the optical medium;
    a sector counter counting a first value, wherein an initiation of the first value to be counted is set by the sector information unit based on the information and/or the PID detector based on the first PID value; and
    a comparing unit determining at least one oncoming groove/land changing point allocated on the optical medium for performing the groove/land polarity conversion, based on when the first value approaches a second value either predetermined in or generated by the sector information unit according to the information.

2. The apparatus as described in claim 1, wherein when the first value approaches the second value, a difference between the first and second values meets a preset range.

3. The apparatus as described in claim 1, wherein when the first value approaches the second value, the first and second values are identical with each other.

4. The apparatus as described in claim 1, further comprising a groove/land toggling unit for toggling the groove/land polarity in response to the at least one oncoming groove/land changing point based on an enabling signal generated from the comparing unit.

5. The apparatus as described in claim 4, wherein after the at least one oncoming groove/land changing point is determined for converting the groove/land polarity, the first value output from the sector counter is set to the initiation and then re-generated until each of the other oncoming groove/land changing points is determined on the optical medium.

6. The apparatus as described in claim 1, wherein the sector information unit comprises:
    a zone detector detecting a zone formed on the optical medium with relation to the first PID value detected from the PID detector;
    a foremost PID control logic providing a PID value indicative of a foremost sector located within the zone to be the second PID value indicative of the second sector;
    a sector number per track and operation logic providing a total number of sectors per a track formed within the zone and processing the total number of sectors per track to be the second value;
    a subtracter for generating a number difference between the first PID value and the second PID value; and
    a remainder operation logic for generating the first value with a remainder generated by the total number of sectors per track dividing the number difference between the first PID value and the second PID value.

7. The apparatus as described in claim 6, wherein the second value is set to the total number of sectors per track, and the initiation of the first value output from the sector counter is set to an integer by the groove/land toggling unit after each of the other oncoming groove/land changing points is determined for converting the groove/land polarity.

8. The apparatus as described in claim 6, wherein when the first value does not approach the second value, the sector counter continues to count the first value until the first value approaches the second value to determine the groove/land changing point on the optical medium.

9. The apparatus as described in claim 1, wherein the sector information unit comprises:
    a reference groove/land detector determining the second PID value indicative of the reference groove/land changing point laid on the optical medium, with reference to the first PID value;
    a sector number per track and operation logic providing a total number of sectors per a track with reference to the first PID value and processing the total number of sectors per track to be the second value; and
    a subtracter for generating the first value with a number difference between the first PID value and the second PID value.

10. The apparatus as described in claim 9, wherein the second value is set by subtracting one sector from the total number of sectors per track, and the initiation of the first value output from the sector counter is set to an integer by the groove/land toggling unit after each of the other oncoming groove/land changing points is determined for converting the groove/land polarity.

11. The apparatus as described in claim 10, wherein when the first value does not approach the second value, the sector counter continues to count the first value until the first value approaches the second value to determine each of the other oncoming groove/land changing points on the optical medium.

12. The apparatus as described in claim 1, wherein the sector information unit further comprises:
    a reference groove/land detector determining the second PID value indicative of the reference groove/land changing point laid on the optical medium, with reference to the first PID value;
    a sector number per track and operation logic providing a total number of sectors per a track with reference to the first PID value;
    a first subtracter for generating a first number difference between the first PID value and the second PID value, and
    a second subtracter for generating the second value by processing a second number difference between the total number of sectors per track and the first number difference.

13. The apparatus as described in claim 1, wherein the sector information unit further comprises:
    a reference groove/land detector determining the second PID value indicative of the reference groove/land changing point laid on the optical medium, with reference to the first PID value;
    a sector number per track and operation logic providing a total number of sectors per a track with reference to the first PID value;
    a first subtracter for generating a first number difference between the first PID value and the second PID value, and a second subtracter for generating a second number difference between the total number of sectors per track and the first number difference.

14. The apparatus as described in claim 1, wherein the sector information unit further comprises:
a reference groove/land detector determining the second PID value indicative of the reference groove/land changing point laid on the optical medium, with reference to the first PID value; and
a subtracter for generating the first value with a first number difference between the first PID value and the second PID value,
wherein when the PID detector detects the first PID value, the PID detector loads the first value from the subtracter to the initiation of the first value counted by the sector counter.

15. The apparatus as described in claim 14, wherein the initiation of the first value output from the sector counter is set to be a total number of sectors per a track on the optical medium by the groove/land toggling unit after each of the other oncoming groove/land changing points is determined for converting the groove/land polarity, and the second value is predetermined to a constant.

16. The apparatus as described in claim 15, wherein when the first value does not approach the second value, the sector counter continues to count down the first value until the first value approaches the second value to determine each of the other oncoming groove/land changing points groove/land changing point on the optical medium.

17. The apparatus as described in claim 1, wherein the sector information unit further comprises:
a groove/land detector determining the second PID value indicative of the reference groove/land changing point laid on the optical medium, with reference to the first PID value; and
a subtracter for generating the second value with subtracting one sector from a first number difference between the first PID value and the second PID value,
wherein when the PID detector detects the first PID value, the PID detector sets the initiation of the first value to be counted by the sector counter to zero.

18. The apparatus as described in claim 1, wherein the sector information unit further comprises a groove/land detector outputting a PID value indicative of at least one of a plurality of groove/land changing points allocated on the optical medium to be the second PID value indicative of the reference groove/land changing point, with reference to the first PID value.

19. A method for converting a groove/land polarity upon a groove/land track change on an optical medium, comprising the following steps of:
detecting a first physical identification (PID) value indicating a physical layout of a first sector laid on the optical medium;
providing an information relative to the optical medium, including a second PID value indicative of either a second sector or at least one reference groove/land changing point laid on the optical medium;
counting a first value, wherein an initiation of the first value to be counted is generated based on the information and/or the first PID value; and
determining at least one other groove/land changing point allocated on the optical medium for performing the groove/land polarity conversion, based on when the first value approaches a second value either predetermined or generated according to the information.

20. An apparatus for converting a groove/land polarity upon a groove/land track change on an optical medium, comprising:
a physical identification (PID) detector detecting a first sector from the optical medium into a first PID value;
a sector information unit providing an information relative to the optical medium, including a second PID value indicative of either a second sector or at least one reference groove/land changing point laid on the optical medium;
a sector counter counting a first value, wherein an initiation of the first value to be counted is set by the sector information unit based on the information and/or the PID detector based on the first PID value;
a comparing unit determining at least one oncoming groove/land changing points allocated on the optical medium, based on when the first value approaches a second value is either predetermined or generated by the sector information unit according to the information; and
a groove/land toggling unit performing the groove/land polarity convention in response to the at least one oncoming groove/land changing point, and setting the initiation of the first value to be counted by the sector counter until each of the other oncoming groove/land changing points is determined on the optical medium.

* * * * *